United States Patent
Avadhani et al.

(10) Patent No.: US 12,204,322 B2
(45) Date of Patent: Jan. 21, 2025

(54) GENERATING ACTION RECOMMENDATIONS FOR MODIFYING PHYSICAL EMISSION SOURCES BASED ON MANY SIMULATIONS OF DIFFERENT SCENARIOS UTILIZING A MODIFIED GRADIENT DESCENT MODEL

(71) Applicant: OneTrust LLC, Atlanta, GA (US)

(72) Inventors: Madan Avadhani, Palo Alto, CA (US); Akhil Dandamudi, Atlanta, GA (US)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 17/650,724

(22) Filed: Feb. 11, 2022

(65) Prior Publication Data
US 2023/0115876 A1    Apr. 13, 2023

Related U.S. Application Data

(60) Provisional application No. 63/262,200, filed on Oct. 7, 2021.

(51) Int. Cl.
*G06F 40/40*    (2020.01)
*G05B 15/02*    (2006.01)
(Continued)

(52) U.S. Cl.
CPC ......... *G05B 23/0216* (2013.01); *G05B 15/02* (2013.01); *G05B 23/0213* (2013.01);
(Continued)

(58) Field of Classification Search
CPC .......... G06N 7/005; G06N 7/01; G06N 3/045; G06N 3/04; G06F 40/40; G06F 3/04847;
(Continued)

(56) References Cited

U.S. PATENT DOCUMENTS

2006/0271210 A1 * 11/2006 Subbu ................. G06F 18/2113
700/44
2009/0030753 A1 * 1/2009 Senturk-Doganaksoy ...................
G06Q 10/0639
705/7.38
(Continued)

FOREIGN PATENT DOCUMENTS

CN    112200350 A    1/2021
JP    2004190620 A  *  7/2004

OTHER PUBLICATIONS

Geng et al. "Electricity production scheduling under uncertainty: Max social welfare vs. min emission vs. max renewable production." Applied Energy 193: 540-549 (Year: 2017).*
(Continued)

*Primary Examiner* — Michael J Huntley
*Assistant Examiner* — Adam C Standke
(74) *Attorney, Agent, or Firm* — Keller Preece PLLC

(57) ABSTRACT

Methods, systems, and non-transitory computer readable storage media are disclosed for generating action recommendations for modifying physical emissions sources based on a plurality of simulations of different scenarios utilizing a modified gradient descent model. Specifically, the disclosed system utilizes the modified gradient descent model to generate emissions value modifications for physical emissions sources corresponding to an entity based on a set of constraints and target emissions values. The disclosed system runs a plurality of simulations to generate modified target emissions values, utilizing the modified gradient descent model, by modifying source attributes of the physical emissions sources according to a plurality of probability distributions representing source attributes of the physical emissions sources. The disclosed system then compares the initial target emissions values to the modified target emis-
(Continued)

sions values determined from the simulations to generate action recommendations for modifying the physical emissions sources.

20 Claims, 24 Drawing Sheets

(51) Int. Cl.
    *G05B 23/02*     (2006.01)
    *G06F 3/04847*     (2022.01)
    *G06N 3/04*     (2023.01)
    *G06N 3/045*     (2023.01)
    *G06N 7/01*     (2023.01)
    *G06Q 10/04*     (2023.01)
    *G06Q 50/06*     (2024.01)

(52) U.S. Cl.
    CPC .......... *G06F 3/04847* (2013.01); *G06F 40/40* (2020.01); *G06N 3/04* (2013.01); *G06N 3/045* (2023.01); *G06N 7/01* (2023.01); *G06Q 10/04* (2013.01); *G06Q 50/06* (2013.01)

(58) Field of Classification Search
    CPC .... G05B 15/02; G05B 23/0213; G06Q 10/04; G06Q 50/06
    See application file for complete search history.

(56) References Cited

U.S. PATENT DOCUMENTS

| | | | |
|---|---|---|---|
| 2011/0273737 A1 | 11/2011 | Hirao | |
| 2014/0316973 A1 | 10/2014 | Steven et al. | |
| 2018/0081999 A1 | 3/2018 | Chappell | |
| 2018/0082000 A1 | 3/2018 | Chappell | |
| 2019/0372345 A1 | 12/2019 | Bain et al. | |
| 2020/0372588 A1* | 11/2020 | Shi | G06Q 50/06 |
| 2021/0065859 A1 | 3/2021 | McKinney et al. | |
| 2021/0073636 A1 | 3/2021 | Federspiel et al. | |
| 2021/0216932 A1* | 7/2021 | Koguma | G06Q 30/0206 |
| 2021/0285017 A1 | 9/2021 | Feldman et al. | |
| 2022/0188652 A1 | 6/2022 | Pabrinkis et al. | |
| 2022/0373638 A1 | 11/2022 | Chrabieh et al. | |
| 2023/0020417 A1* | 1/2023 | Elbsat | G06Q 10/06313 |
| 2023/0065744 A1 | 3/2023 | Cousins et al. | |

OTHER PUBLICATIONS

Lin et al. "Planning of energy system management and GHG-emission control in the Municipality of Beijing—An inexact-dynamic stochastic programming model." Energy Policy 37.11 (Year: 2009).*
Geng et al. "Electricity production scheduling under uncertainty: Max social welfare vs. min emission vs. max renewable production." Applied Energy 193 (Year: 2017).*
Kung, Li et al., "A recommender system for the optimal combination of energy resources with cost-benefit analysis." 2015 International Conference on Industrial Engineering and Operations Management (IEOM). IEEE, (Year: 2015).*
International Search Report & Written Opinion as received in PCT/US2022/070629 dated Apr. 4, 2022.
Bains et al. CO2 capture from the industry sector Progress in Energy and Combustion Science 63 (2017) 146-172.
International Search Report & Written Opinion as received in PCT/US2022/015255 dated Apr. 4, 2022.
International Search Report & Written Opinion as received in PCT/US2022/070685 dated May 9, 2022.
U.S. Appl. No. 17/592,878, May 16, 2022, Office Action.
U.S. Appl. No. 17/592,878, Aug. 23, 2022, Office Action.
U.S. Appl. No. 17/592,878, Jan. 25, 2023, Notice of Allowance.
U.S. Appl. No. 17/592,878, Jul. 18, 2022, Office Action.
U.S. Appl. No. 17/592,878, Nov. 23, 2022, Office Action.
U.S. Appl. No. 17/592,878, Mar. 9, 2023, Notice of Allowance.
U.S. Appl. No. 17/651,388, Mar. 28, 2023, Notice of Allowance.
U.S. Appl. No. 18/326,499, Dec. 15, 2023, Office Action.
U.S. Appl. No. 18/326,474, Jun. 25, 2024, Notice of Allowance.
U.S. Appl. No. 18/326,499, Jul. 29, 2024, Notice of Allowance.
U.S. Appl. No. 18/326,499, Apr. 3, 2024, Office Action.
International Preliminary Report on Patentability as received in PCT/US2022/015255 dated Apr. 18, 2024.
International Preliminary Report on Patentability as received in PCT/US2022/070629 dated Apr. 18, 2024.
International Preliminary Report on Patentability as received in PCT/US2022/070685 dated Apr. 18, 2024.

* cited by examiner

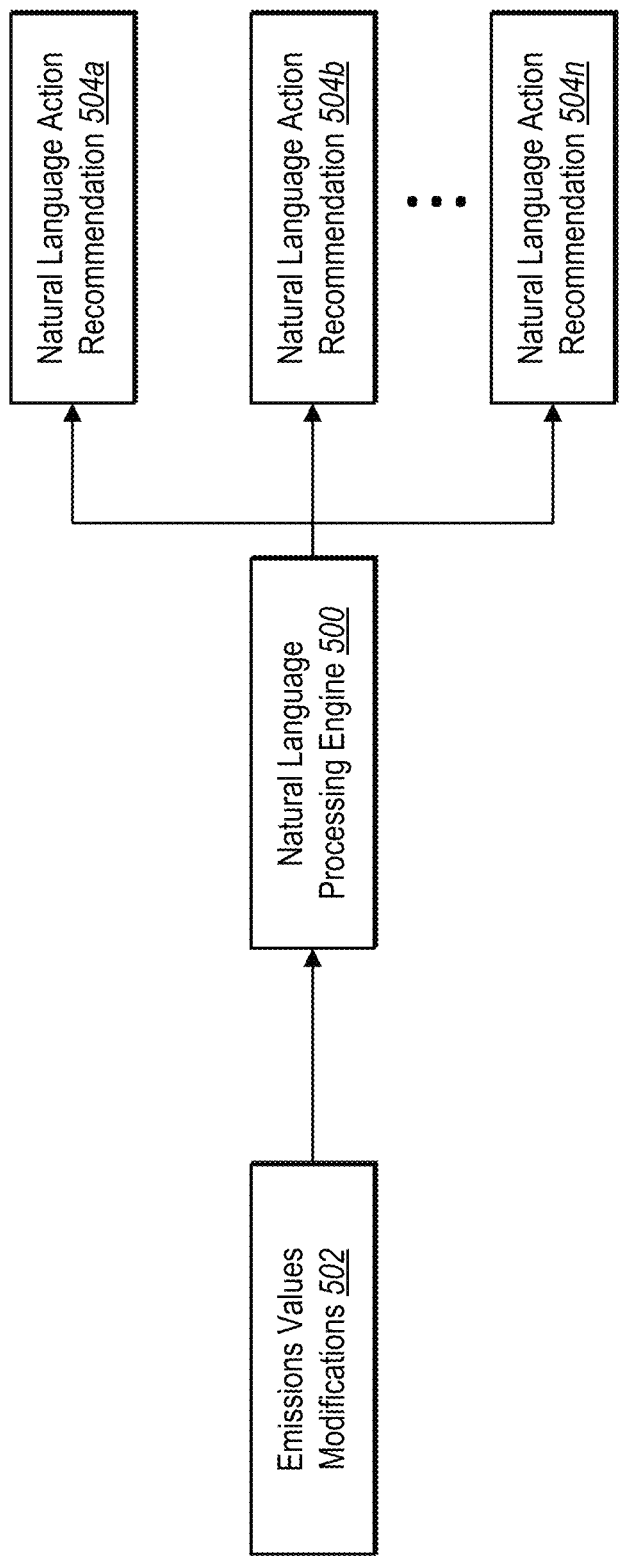

| Category | Entity Usage | Emission Source | Unit Cost | Unit Size | Unit | 2020 Units |
|---|---|---|---|---|---|---|
| Fuel Type | Restaurant Heater | Blast Furnace Gas | 10 | 1 | mmBTU | 15 |
| Fuel Type | Pizza Oven | Blast Furnace Gas | 20 | 1 | mmBTU | 10 |
| Fuel Type | Kitchen | Natural Gas | 20 | 1 | mmBTU | 15 |
| Fuel Type | Office Building | Mixed (Commercial Sector) | 30 | 1 | mmBTU | 5 |
| S1- Mobile Combustion | Business Travel | Aviation Gasoline - Aviation Gasoline Aircraft | 60 | 1 | gal (US) | 14 |
| S1- Mobile Combustion | Delivery 1 | Electricity- Mobile - Electric Vehicle | 23 | 1 | gal (US) | 12 |
| S1- Mobile Combustion | Delivery 2 | Diesel Fuel - Light duty trucks | 14 | 1 | gal (US) | 12 |
| S1- Mobile Combustion | Delivery 3 | CNG- Light-duty vehicles | 34 | 1 | gal (US) | 34 |
| S3- Transport | Employee Travel 1 | Passenger Car A | 12 | 1 | vehicle-mile | 3 |
| S3- Transport | Employee Travel 2 | Light-Duty Truck B | 8 | 1 | vehicle-mile | 4 |
| | TOTAL | | 231 | | | |

*Fig. 8A*

| | Emissions | | | | | |
|---|---|---|---|---|---|---|
| CO2 factor | CH4 factor | N2O factor | BIO CO2 factor | AR4 (CO2e) factor | AR5 (CO2e) factor | |
| 274.32 | 0.02 | 0.10 | 0.00 | 274.35 | 274.35 | |
| 274.32 | 0.02 | 0.10 | 0.00 | 274.35 | 274.35 | |
| 53.06 | 1.00 | 0.10 | 0.00 | 53.11 | 53.11 | |
| 94.27 | 11.00 | 1.60 | 0.00 | 95.02 | 95.00 | |
| 69.25 | 3.00 | 0.60 | 0.00 | 69.50 | 69.49 | |
| 0.00 | 0.00 | 0.00 | 0.00 | 0.00 | 0.00 | |
| 10.21 | 0.00 | 0.00 | 0.00 | 10.22 | 10.22 | |
| 0.41 | 0.09 | 0.01 | 0.00 | 4.45 | 4.51 | |
| 0.34 | 0.02 | 0.01 | 0.00 | 0.35 | 0.35 | |
| 0.47 | 0.02 | 0.02 | 0.00 | 0.48 | 0.48 | |
| 776.65 | 15.17 | 2.54 | 0.00 | 781.83 | 781.86 | |

| User Constraints | | Optimizer Output |
|---|---|---|
| Source Max Value | Source Min Value | Results |
| 18 | 9 | 14 |
| 15 | 10 | 9 |
| 22 | 15 | 15 |
| 8 | 5 | 5 |
| 21 | 14 | 14 |
| 18 | 12 | 12 |
| 18 | 12 | 12 |
| 44 | 34 | 39 |
| 5 | 3 | 3 |
| 7 | 4 | 4 |

*Fig. 8C*

| | 2020 Costs | | Results Costs | | 2020 Emissions | | Results Emissions | |
|---|---|---|---|---|---|---|---|---|
| | 2020 Costs | 2020 % Costs | Results Costs | Results % Costs | 2020 Total Emissions | 2020 Emission % | Results Total Emissions | Results Emission % |
| | 150 | 5% | 140 | 4% | 12347.09 | 44% | 11523.95 | 43% |
| | 200 | 6% | 180 | 5% | 8231.39 | 29% | 7408.26 | 28% |
| | 300 | 9% | 300 | 9% | 2405.84 | 9% | 2405.84 | 9% |
| | 150 | 5% | 150 | 4% | 1484.47 | 5% | 1484.47 | 6% |
| | 840 | 25% | 840 | 24% | 2965.86 | 11% | 2965.86 | 11% |
| | 276 | 8% | 276 | 8% | 0.00 | 0% | 0.00 | 0% |
| | 168 | 5% | 168 | 5% | 367.73 | 1% | 367.73 | 1% |
| | 1156 | 35% | 1326 | 38% | 321.71 | 1% | 369.02 | 1% |
| | 36 | 1% | 36 | 1% | 3.20 | 0% | 3.20 | 0% |
| | 32 | 1% | 32 | 1% | 5.85 | 0% | 5.85 | 0% |
| Total | 3308 | 100% | 3448 | 100% | 28133.14 | 100% | 26534.17 | 100% |

*Fig. 8D*

| 808 | 2020 Emisssions | | | | | | Total 2020 Emissions |
|---|---|---|---|---|---|---|---|
| CO2 factor | CH4 factor | N2O factor | BIO CO2 factor | AR4 (CO2e) factor | AR5 (CO2e) factor | | Total |
| 4114.80 | 0.33 | 1.50 | 0.00 | 4115.26 | 4115.21 | | 12347.09 |
| 2743.20 | 0.22 | 1.00 | 0.00 | 2743.50 | 2743.47 | | 8231.39 |
| 795.90 | 15.00 | 1.50 | 0.00 | 796.72 | 796.72 | | 2405.84 |
| 471.35 | 55.00 | 8.00 | 0.00 | 475.11 | 475.01 | | 1484.47 |
| 969.50 | 42.00 | 8.40 | 0.00 | 973.05 | 972.90 | | 2965.86 |
| 0.00 | 0.00 | 0.00 | 0.00 | 0.00 | 0.00 | | 0.00 |
| 122.52 | 0.00 | 0.00 | 0.00 | 122.61 | 122.60 | | 367.73 |
| 13.85 | 3.04 | 0.21 | 0.00 | 151.15 | 153.47 | | 321.71 |
| 1.03 | 0.06 | 0.03 | 0.00 | 1.04 | 1.04 | | 3.20 |
| 1.89 | 0.08 | 0.07 | 0.00 | 1.91 | 1.91 | | 5.85 |
| 9234.03 | 115.72 | 20.71 | 0.00 | 9380.35 | 9382.32 | | 28133.14 |
| | | | | | | Total | |

*Fig. 8E*

| CO2 factor | CH4 factor | N2O factor | BIO CO2 factor | AR4 (CO2e) factor | AR5 (CO2e) factor | Total Results Emissions Total |
|---|---|---|---|---|---|---|
| 3840.48 | 0.31 | 1.40 | 0.00 | 3840.90 | 3840.86 | 11523.95 |
| 2468.88 | 0.20 | 0.90 | 0.00 | 2469.15 | 2469.12 | 7408.26 |
| 795.90 | 15.00 | 1.50 | 0.00 | 796.72 | 796.72 | 2405.84 |
| 471.35 | 55.00 | 8.00 | 0.00 | 475.11 | 475.01 | 1484.47 |
| 969.50 | 42.00 | 8.40 | 0.00 | 973.05 | 972.90 | 2965.86 |
| 0.00 | 0.00 | 0.00 | 0.00 | 0.00 | 0.00 | 0.00 |
| 122.52 | 0.00 | 0.24 | 0.00 | 122.61 | 122.60 | 367.73 |
| 15.88 | 3.48 | 0.03 | 0.00 | 173.38 | 176.03 | 369.02 |
| 1.03 | 0.06 | 0.03 | 0.00 | 1.04 | 1.04 | 3.20 |
| 1.89 | 0.08 | 0.07 | 0.00 | 1.91 | 1.91 | 5.85 |
| 8687.43 | 116.12 | 20.54 | 0.00 | 8853.88 | 8856.20 | 26534.17 |

Total

GENERATING ACTION RECOMMENDATIONS FOR MODIFYING PHYSICAL EMISSION SOURCES BASED ON MANY SIMULATIONS OF DIFFERENT SCENARIOS UTILIZING A MODIFIED GRADIENT DESCENT MODEL

CROSS-REFERENCE TO RELATED APPLICATIONS

This application claims priority to, and the benefit of, U.S. Provisional Patent Application No. 63/262,200, filed Oct. 7, 2021, which is incorporated herein by reference in its entirety.

BACKGROUND

Increases in prevalence of technological and manufacturing processes over recent decades—in addition to increasing population numbers—have led to increasing levels of greenhouse gas emissions, leading to a rapidly changing climate. As a result, many countries and organizations are increasing emissions measuring and reporting regulations for various entities based on internal and external operations of the entities. Because many entities (even small businesses) generate substantial amounts of emissions of various types from potentially hundreds of different sources, determining overall emissions from previous time periods can be a very complex and difficult problem. Furthermore, determining future emissions based on growth or other changes to entity operations given the number of emissions types and sources given various constraints is also challenging. Given the emergent nature of emissions standards and reporting, conventional systems are unable to monitor emissions from large numbers of sources while also modeling future emissions under a number of different constraints.

SUMMARY

This disclosure describes one or more embodiments of methods, non-transitory computer readable media, and systems that solve the foregoing problems (in addition to providing other benefits) by generating action recommendations for modifying physical emissions sources based on a plurality of simulations of different scenarios utilizing a multi-variable objective algorithm. Specifically, the disclosed systems utilize the multi-variable objective algorithm (e.g., a mixed-integer programming algorithm such as a modified gradient descent model) to generate emissions value modifications for physical emissions sources corresponding to an entity based on a set of constraints and target emissions values corresponding to physical emissions sources and/or operations associated with the entity. The disclosed systems run a plurality of simulations to generate modified target emissions values, utilizing the multi-variable objective algorithm, by modifying source attributes and usage of the physical emissions sources according to a plurality of probability distributions representing source attributes of the physical emissions sources. The disclosed systems compare the initial target emissions values to the modified target emissions values determined from the simulations to generate action recommendations for modifying the physical emissions sources. The disclosed systems thus utilize a plurality of simulations via a multi-variable objective algorithm to efficiently, accurately, and flexibly determine predicted changes to emissions values under a large number of different possible scenarios.

BRIEF DESCRIPTION OF THE DRAWINGS

Various embodiments will be described and explained with additional specificity and detail through the use of the accompanying drawings in which:

FIG. 5 illustrates an example of the emissions optimizer system utilizing generating natural language action recommendations for modifying emissions values in accordance with one or more implementations.

FIGS. 8A-8F illustrate chart diagrams of past data and modeled data for physical emissions sources corresponding to an entity in accordance with one or more implementations.

DETAILED DESCRIPTION

Figure 1:
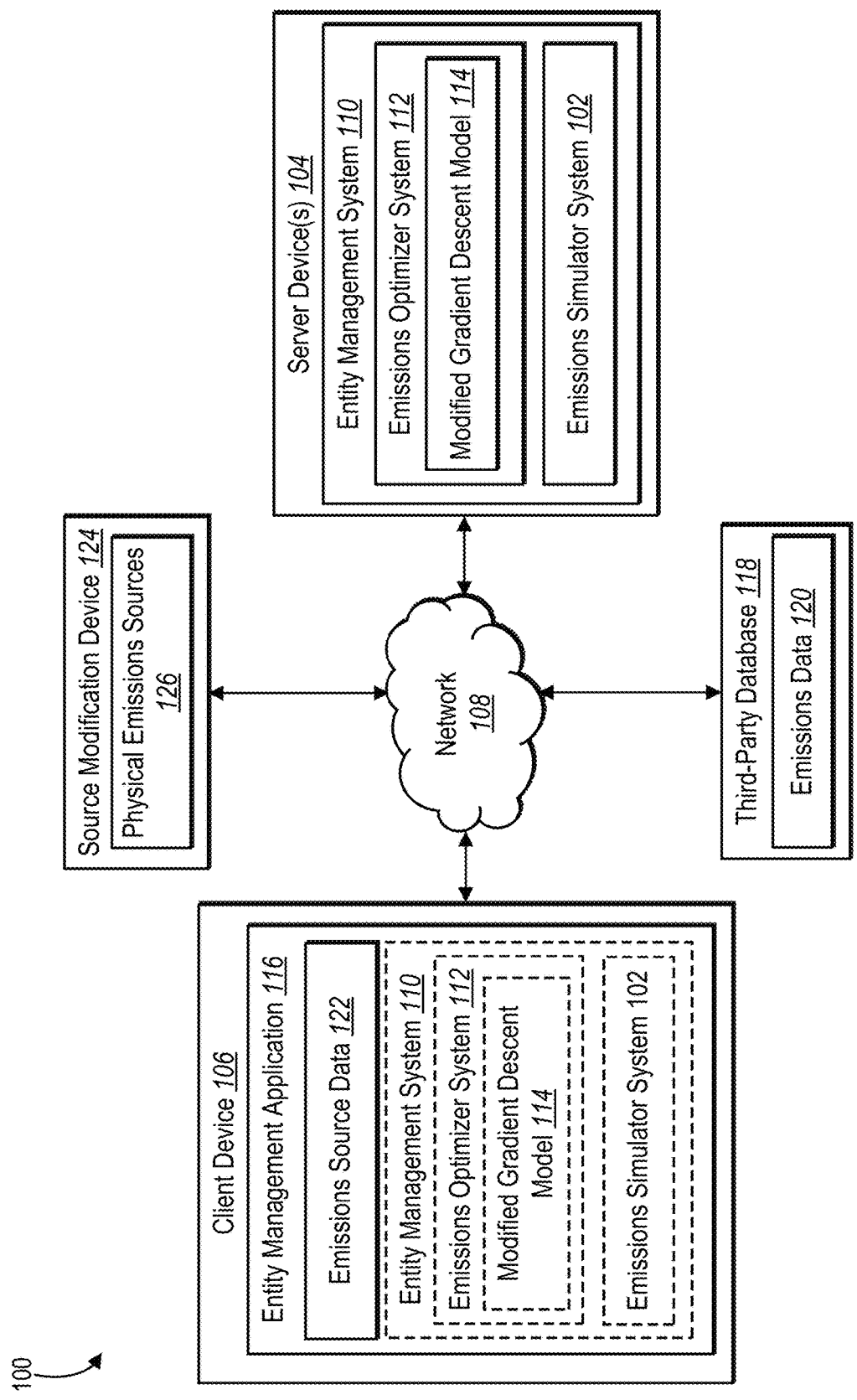
FIG. 1 illustrates an example of a system environment in which an emissions optimizer system and an emissions simulator system can operate in accordance with one or more implementations.

This disclosure describes one or more embodiments of an emissions simulator system that utilizes a plurality of simulations of possible scenarios with a multi-variable objective algorithm to generate action recommendations for modifying physical emissions sources. In one or more embodiments, the emissions simulator system utilizes the multi-variable objective algorithm (e.g., a mixed-integer programming algorithm such as a modified gradient descent model) to generate emissions value modifications for physical emissions sources corresponding to an entity based on initial target emissions values and initial source attributes of the physical emissions sources. The emissions simulator system determines modified source attributes from a set of probability distributions that represents source attributes and usage of the physical emissions sources. The emissions simulator system performs a plurality of simulations by utilizing the modified gradient descent model to generate modified target emissions values (e.g., simulated emissions values) according to the modified source attributes. The emissions simulator system compares the modified target emissions values to the initial target emissions values to generate one or more action recommendations for modifying the physical emissions sources.

As mentioned, in one or more embodiments, the emissions simulator system generates initial emissions value modifications for modifying a plurality of physical emissions sources corresponding to an entity. Specifically, the emissions simulator system generates a large number of scenarios involving parameters such as costs, constraints, and usage, which the emissions simulator system feeds into a modified gradient descent model to iteratively adjust usage and/or emissions values of the physical emissions sources for meeting target emissions values according to a set of constraints. For example, the emissions simulator system determines initial source attributes for the physical emissions sources and utilizes the modified gradient descent model to iteratively adjust emissions values of the physical emissions sources according to the initial source attributes. Based on the results of the modified gradient descent model, the emissions simulator system determines probability distributions of source attributes (e.g., a cost associated with a physical emissions source based on historical data, market factors, etc.). In some embodiments, the emissions simulator system or another system utilizes the probability distributions to determine one or more modifications to the physical emissions sources that meet the target emissions values while also satisfying the set of constraints under simulated conditions.

In one or more embodiments, the emissions simulator system simulates a plurality of different scenarios with a plurality of different source attributes utilizing the modified gradient descent model. In particular, the emissions simulator system determines a plurality of modified source attributes corresponding to the physical emissions sources based on one or more probability distributions representing source attributes and usage of the physical emissions sources. For instance, the emissions simulator system utilizes a Monte Carlo sampling method or a heuristic sampling method to build probability distributions for the source attributes and select the modified source attributes from the probability distributions. In some embodiments, the emissions simulator system receives user inputs defining certain aspects of the probability distributions. The emissions simulator system thus determines modified source attributes to represent different possible scenarios for the physical emissions sources corresponding to the entity.

According to one or more embodiments, in connection with determining modified source attributes, the emissions simulator system utilizes the modified gradient descent model to generate modified target emissions values. Specifically, the emissions simulator system generates the modified target emissions values utilizing the modified gradient descent model with the modified source attributes. For instance, the emissions simulator system simulates target emissions values by utilizing the modified gradient descent model to iteratively adjust usage and/or emissions values, which allows the emissions simulator system to determine final emissions values based on the modified source attributes. Accordingly, the emissions simulator system determines how the different scenarios affect the emissions values produced by the physical emissions sources.

In additional embodiments, the emissions simulator system generates action recommendations based on the simulations. In particular, the emissions simulator system compares the modified target emissions values to the initial (e.g., desired) target emissions values. For example, the emissions simulator system determines whether the entity is able to achieve the target emissions values in the different scenarios for the physical emissions sources. In some embodiments, the emissions simulator system also considers various constraints in the simulations. To illustrate, the emissions simulator system determines differences between the modified target emissions values and the initial target emissions values. The emissions simulator system generates action recommendations for modifying the physical emissions sources based on the differences between the modified target emissions values and the initial target emissions values.

As mentioned, conventional systems have a number of shortcomings in relation to managing and modeling emissions associated with entity operations. For example, some conventional systems for controlling the operations of emissions sources rely on tools that track data such as inventory, labor, or other aspects of entity operations. While such conventional systems provide useful insights regarding such emissions, the conventional systems are unequipped to configure emissions sources for compliance with recent emissions standards or to manage emissions measuring and reporting according to recent emissions standards. Due to the inability of conventional systems to track or model emissions sources and emissions production, entities attempting to control the operations of emissions sources consistently with operational goals via conventional systems must manually monitor emissions sources. Given the large number of physical emissions sources (and different types of emissions sources) and other variables involved with tracking and modeling emissions for even small entities, however, manually tracking and/or predicting emissions via conventional systems is inefficient and inaccurate.

The disclosed emissions optimizer system and emissions simulator system provide a number of advantages over conventional systems. For example, the emissions simulator system provides flexibility for computing systems that control operations of physical emissions sources by tracking and modeling emissions produced by large numbers of various physical emissions sources for an entity. In particular, in contrast to conventional systems that are unable to configure emissions sources (thus requiring manual monitoring and configuration by entities), the emissions simulator system automatically tracks and models emissions values for past and future time periods for different types of entities with different emissions sources. To illustrate, by managing an entity's emissions consistent with other operational data of the entity, the emissions optimizer system provides up-to-date, detailed emissions data that allows entity's to easily generate a plan for reducing emissions. Additionally, the emissions simulator system also provides additional flexibility by simulating many different possible scenarios in case aspects of the physical emissions sources change over time. The emissions optimizer system and emissions simulator system also provide optimal parameters for an entity's business or financial constraints while achieving specified emissions and cost goals given a variety of possible conditions. In addition, the emissions optimizer system and emissions simulator system are able to automatically determine whether a solution is possible given the various constraints and goals and suggests various modifications to the constraints or goals to obtain a solution within the parameters of the different conditions.

Furthermore, the emissions optimizer system also improves efficiency of computing systems for controlling operations of emissions sources. Specifically, the emissions simulator system utilizes a modified gradient descent model to quickly and efficiently model emissions values for large numbers of emissions sources for applying modifications to operations of emissions sources for future time periods. For instance, the emissions simulator system utilizes the modified gradient descent model to iterate through many emissions sources (e.g., hundreds or thousands of different emissions sources). Accordingly, the emissions simulator system quickly determines and applies modifications to specific physical emissions sources that are most impactful to emissions without needing to iterate through every possible combination of modifications. The emissions simulator system also efficiently generates action recommendations for implementing the modifications to the specific physical emissions sources while taking additional variables (e.g., target emissions values and various constraints) into account that otherwise significantly increase the complexity of the optimization process with conventional systems.

The emissions simulator system improves efficiency during simulations of different scenarios. In particular, the emissions simulator system also provides configuration of a plurality of physical emissions sources by utilizing the modified gradient descent model to perform a plurality of simulations for different scenarios for the physical emissions sources based on a variety of different source attributes, costs, and usage. Thus, the emissions simulator system leverages probability distributions representing source attributes of physical emissions sources to determine different possible scenarios for simulating via the modified gradient descent model. By utilizing a modified gradient descent model to evaluate the statistical significance of different source attributes on overall emissions values, costs, or other characteristics of the physical emissions sources, the emissions simulator system further improves the efficiency of the computing devices controlling the operations of emissions sources.

Additionally, the emissions simulator system also provides improved accuracy for computing systems that implement entity management. For example, the emissions simulator system provides configuration of a plurality of physical emissions sources by utilizing the modified gradient descent model to iteratively process emissions values for the physical emissions sources given defined constraints and one or more target emissions values. The emissions simulator system also utilizes the modified gradient descent model to perform a plurality of simulations for many different scenarios to determine the impact of changes to the physical emissions sources. The emissions simulator system thus accurately determines specific actions for modifying the operations of the emissions sources to achieve specific goals while complying with the various constraints in a number of different scenarios.

Turning now to the figures, FIG. 1 includes an embodiment of a system environment 100 in which an emissions simulator system 102 is implemented. In particular, the system environment 100 includes server device(s) 104 and a client device 106 in communication via a network 108. Moreover, as shown, the server device(s) 104 include an entity management system 110, which includes the emissions simulator system 102 and an emissions optimizer system 112. As further illustrate in FIG. 1, the emissions optimizer system 112 includes a modified gradient descent model 114. Additionally, the client device 106 includes an entity management application 116, which optionally includes the entity management system 110, the emissions simulator system 102, and the emissions optimizer system 112, which further includes the modified gradient descent model 114. In additional embodiments, as illustrated in FIG. 1, the system environment 100 includes a third-party database 118, which includes emissions data 120. In further embodiments, the system environment 100 includes a source modification device 124, which manages operations for physical emissions sources 126.

As shown in FIG. 1, in one or more implementations, the server device(s) 104 includes or hosts the entity management system 110. Specifically, the entity management system 110 includes, or is part of, one or more systems that implement management of entity operations. For example, the entity management system 110 provides tools for generating, viewing, or otherwise interacting with operational data (e.g., inventory, labor, emissions data) associated with an entity. To illustrate, the entity management system 110 communicates with the client device 106 via the network 108 to provide the tools for display and interaction via the entity management application 116 at the client device 106. Additionally, in some embodiments, the entity management system 110 receives data from the client device 106 in connection with managing operational data associated with the entity, including requests to perform operations based on digital content stored at the server device(s) 104 (or at another device such as a source repository) and/or requests to store digital content from the client device 106 at the server device(s) 104 (or at another device). In some embodiments, the entity management system 110 receives interaction data for generating or viewing operational data based on digital content (e.g., emissions source data 122) at the client device 106, processes the interaction data (e.g., to generate or edit operational data), and provides the results of the interaction data to the client device 106 for display via the entity management application 116 or to a third-party system.

In one or more embodiments, the entity management system 110 provides tools for generating operational data (including emissions data) for an entity. In particular, the entity management system 110 provides tools (e.g., via the entity management application 116) for selecting, viewing, or generating emissions data or action recommendations corresponding to the emissions data. Additionally, the entity management system 110 utilizes the emissions optimizer system 112 to intelligently generate action recommendations for modifying physical emissions sources corresponding to an entity based on the emissions source data 122 provided by the client device. The emissions optimizer system 112 also utilizes a database (e.g., the third-party database 118) including emissions data 120 for determining emissions values corresponding to the emissions source data 122. For example, the emissions optimizer system 112 utilizes the modified gradient descent model 114 to iteratively adjust emissions values based on the emissions source data 122 according to on one or more target values. Furthermore, in one or more embodiments, the emissions optimizer system 112 utilizes the modified gradient descent model 114 to generate the action recommendations based on a plurality of constraints provided to the entity management system 110 (e.g., from the client device 106).

In additional embodiments, the entity management system 110 utilizes the emissions simulator system 102 to intelligently simulate a plurality of different scenarios for comparing to initial results of the modified gradient descent model 114 for the emissions optimizer system 112. Specifically, the emissions simulator system 102 utilizes the modified gradient descent model 114 of the emissions optimizer system 112 to simulate emissions values or other values with different baselines. By simulating a number of different scenarios utilizing the modified gradient descent model 114, the emissions simulator system 102 provides comparison data for an entity in case the emissions source data 122 (or related data) changes in the future.

In one or more embodiments, after the emissions optimizer system 112 and the emissions simulator system 102 generate action recommendations for modifying physical emissions sources associated with an entity, the entity management system 110 provides the action recommendations to the client device 106 for display. For instance, the entity management system 110 sends the action recommendations to the client device 106 via the network 108 for display via the entity management application 116. Additionally, the client device 106 can receive additional inputs to apply additional changes to the emissions source data 122, constraints, and/or target emissions values or to perform additional simulations. The entity management system 110 utilizes the emissions optimizer system 112 to generate additional action recommendations based on the updated emissions source data 122, constraints, and/or target emissions values or for the additional simulations.

According to one or more embodiments, the entity management system 110, the emissions optimizer system 112, the emissions simulator system 102, and/or the client device 106 provide instructions for implementing one or more actions based on the action recommendations to the source modification device 124 (or a plurality of source modification devices). To illustrate, in response to a user interaction via the client device 106 to select one or more action recommendations, the client device 106, the emissions optimizer system 112, or the emissions simulator system 102 sends instructions to the source modification device 124 to perform one or more corresponding operations for modifying the physical emissions sources 126. The source modification device 124 performs the operation(s) by modifying the physical emissions sources 126, such as by establishing/modifying control limits that limit operations of one or more physical emissions sources (e.g., setting automatic time limits, turning on/off specific sources, restricting use based on time/usage thresholds, controlling gas/electricity flow, travel budget availability for employees).

In additional embodiments, the server device(s) 104 provide source modification instructions directly to the source modification device 124 such that the source modification device 124 automatically applies the modifications to the physical emissions sources 126. Accordingly, the source modification device 124 includes devices or machinery that modify operations associated with the physical emissions sources 126. In one or more embodiments, the source modification device 124 includes a computing device (or other physical control device including a processor) for executing instructions related to controlling the physical emissions sources 126.

Specifically, in one or more embodiments, the emissions optimizer system 112 sends instructions to the source modification device 124 (a controller, a central processing device, a thermostat, etc.) to modify operations of a physical emission source 126 (e.g., an oven, an HVAC system, a furnace, a boiler, a water heater, light bulbs, etc.). For example, the emissions optimizer system 112 or the emissions simulator system 102 sends instructions to source modification device 124 to limit operation of a physical emission source 126 to certain hours during the day, to a certain number of hours a day, or to stay within one or more operating parameters (e.g., minimum/maximum temperature, minimum/maximum speed, minimum/maximum power).

In one or more embodiments, the server device(s) 104 include a variety of computing devices, including those described below with reference to FIG. 15. For example, the server device(s) 104 includes one or more servers for storing and processing data associated with operational data, emissions data, and action recommendations for modifying physical emissions sources for an entity. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 15. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with digital content (e.g., emissions source data, emissions data, action recommendations). In some embodiments, the client device 106 also performs functions for generating, capturing, or accessing data to provide to the entity management system 110 and the emissions optimizer system 112 in connection with entity management. For example, the client device 106 communicates with the server device(s) 104 via the network 108 to provide information (e.g., user interactions) associated with generating action recommendations. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 15.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the emissions optimizer system 112 and the emissions simulator system 102 being implemented by a particular component and/or device within the system environment 100, the emissions optimizer system 112 and/or the emissions simulator system 102 can be implemented, in whole or in part, by other computing devices and/or components in the system environment 100 (e.g., the client device 106).

In particular, in some implementations, the emissions optimizer system 112 on the server device(s) 104 supports the emissions optimizer system 112 and the emissions simulator system 102 on the client device 106. For instance, the emissions optimizer system 112 and/or the emissions simulator system 102 on the server device(s) 104 generates or trains the emissions optimizer system 112 (e.g., the modified gradient descent model 114) and/or the emissions simulator system 102 for the client device 106. The server device(s) 104 provides the generated/trained emissions optimizer system 112 and/or the generated/trained emissions simulator system 102 to the client device 106. In other words, the client device 106 obtains (e.g., downloads) the emissions optimizer system 112 and/or the emissions simulator system 102 from the server device(s) 104. At this point, the client device 106 is able to utilize the emissions optimizer system 112 and/or the emissions simulator system 102 to generate operational/emissions data and action recommendations independently from the server device(s) 104.

In alternative embodiments, the emissions optimizer system 112 and/or the emissions simulator system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform emissions data and action recommendation generation operations, and, in response, the emissions optimizer system 112, the emissions simulator system 102, or the entity management system 110 on the server device(s) 104 performs operations to generate emissions data and action recommendations. The server device(s) 104 provide the output or results of the operations to the client device 106.

Figure 2:
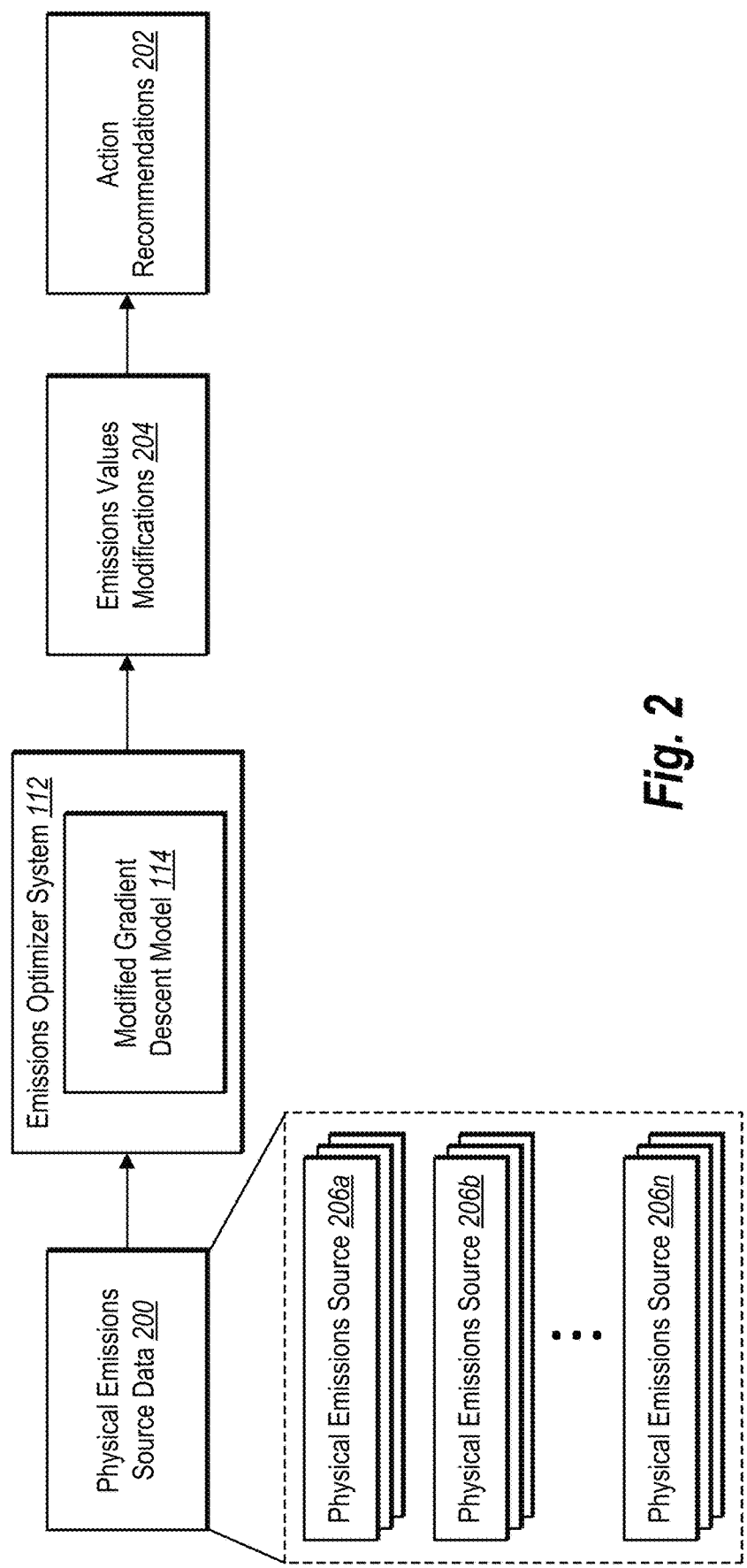
FIG. 2 illustrates an example of an overview of a process of the emissions optimizer system utilizing a modified gradient descent model to generate action recommendations for modifying physical emissions sources in accordance with one or more implementations.

As mentioned, the emissions optimizer system 112 utilizes data indicating emissions produced by an entity to generate action recommendations for modifying one or more physical emissions sources. FIG. 2 illustrates an overview of the emissions optimizer system 112 processing physical emissions source data 200 to generate action recommendations 202. Specifically, the emissions optimizer system 112 utilizes the modified gradient descent model 114 to generate emissions values modifications 204 from the physical emissions source data 200. The emissions optimizer system 112 generates the action recommendations 202 from the emissions values modifications 204.

In one or more embodiments, the emissions optimizer system 112 determines the physical emissions source data 200 in connection with a plurality of physical emissions sources for an entity. For example, the physical emissions source data 200 includes a number and a type of each of a plurality of physical emissions sources corresponding to the entity. FIG. 2 illustrates that the physical emissions source data 200 includes data associated with a plurality of physical emissions source $206a$-$206n$. To illustrate, the physical emissions source data 200 includes a number of units of a first physical emissions source $206a$. The physical emissions source data 200 can also include a source type of the first physical emissions source $206a$.

In one or more embodiments, a physical emissions source (or "emissions source") includes an object, substance, or action that produces physical emissions. For instance, a physical emissions source includes actions such as, but not limited to, objects, substances, or actions related to travel by employees of an entity or delivery drivers utilizing transportation vehicles (e.g., cars, trucks, airplanes) that the entity may or may not own. In additional examples, a physical emissions source includes objects or substances such as, but not limited to, utilities (e.g., electricity, natural gas, water) on properties owned or used by an entity, vehicles owned or used by an entity, gases or fuels used by furnaces or heating elements, cooking tools such as stoves or ovens, manufacturing tools including assembly lines or individual parts of an assembly line, or agricultural byproducts that generate physical emissions.

According to one or more embodiments, emissions (or "physical emissions") include specific substances generated or produced by one or more sources. For example, emissions include specific gases or liquids. To illustrate, the emissions optimizer system 112 determines emissions that are categorized as greenhouse gases that absorb and emit radiant energy within a thermal infrared range and are correlated with (or cause) the greenhouse effect in relation to climate change. Specifically, physical emissions include various factors such as, but not limited to, carbon dioxide, methane, nitrous oxide, water vapor, or ozone. Additionally, in one or more embodiments, the emissions optimizer system 112 determines various climate change factors based on physical emissions recognized in emissions standards including, but not limited to, a CO2 factor, a CH4 factor, a N2O factor, a BIO CO2 factor, an AR4 (CO2e) factor, and an AR5 (CO2e) factor.

Furthermore, in one or more embodiments, the emissions optimizer system 112 utilizes the modified gradient descent model 114 to generate the emissions values modifications 204 based on adjustments to emissions values corresponding to the physical emissions source data 200. Specifically, as described in more detail with respect to FIG. 3 and FIG. 4, the emissions optimizer system 112 utilizes the modified gradient descent model 114 to iteratively adjust emissions values for different physical emissions sources to attempt to achieve one or more target emissions values. Additionally, the emissions optimizer system 112 generates the action recommendations 202 based on the emissions values modifications 204 to provide to the entity.

Figure 3:
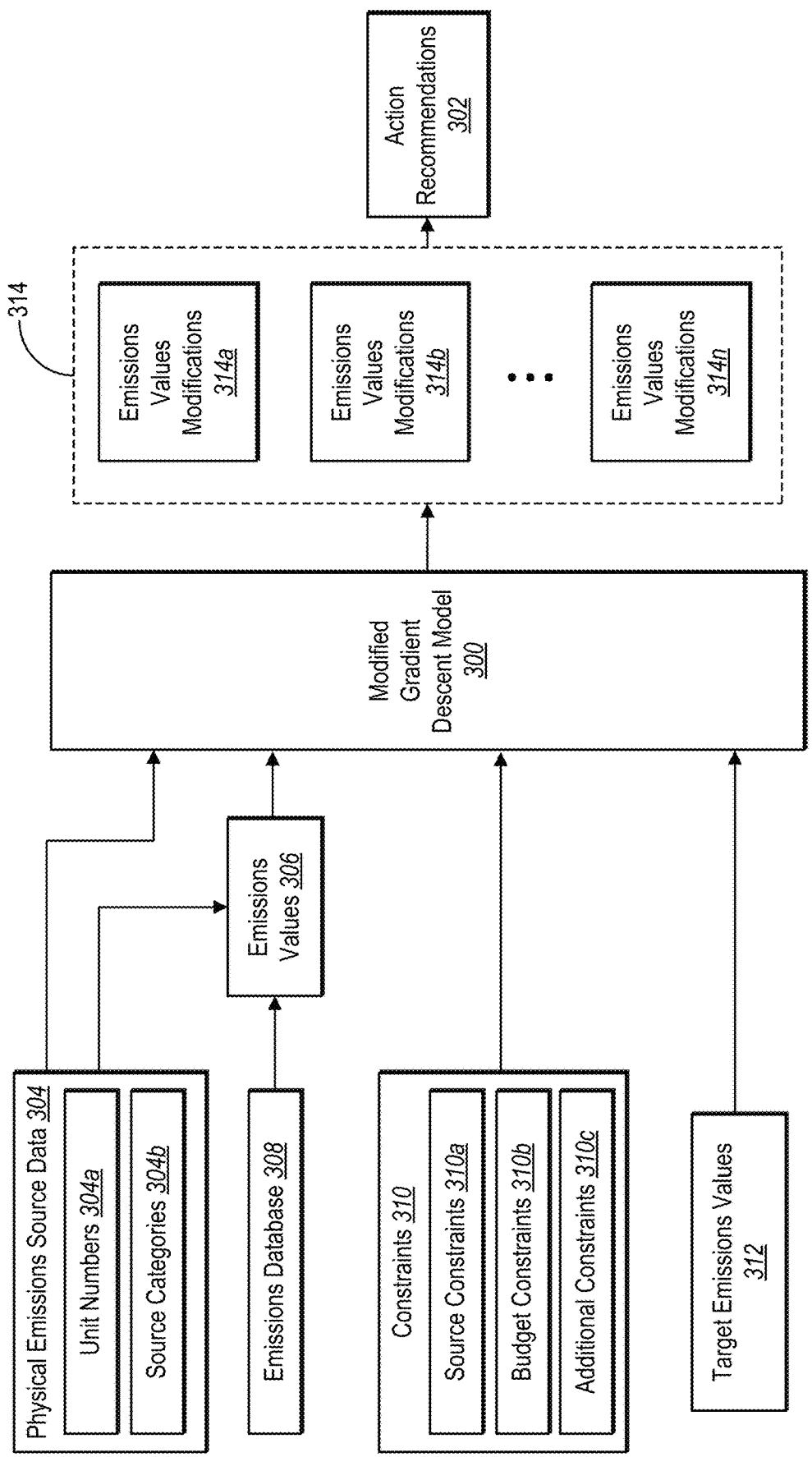
FIG. 3 illustrates an example of a detailed process of the emissions optimizer system utilizing a modified gradient descent model to generate action recommendations for modifying physical emissions sources in accordance with one or more implementations.

FIG. 3 illustrates a diagram of a detailed process of the emissions optimizer system generating action recommendations for modifying physical emissions sources corresponding to an entity. In particular, the emissions optimizer system 112 utilizes a modified gradient descent model 300 to determine one or more actions that the entity may perform to achieve one or more emissions goals given various constraints. For example, the emissions optimizer system 112 utilizes the modified gradient descent model 300 to generate action recommendations 302 to modify physical emissions for meeting the emissions goals.

As illustrated in FIG. 3, the emissions optimizer system 112 determines physical emissions source data 304 for physical emissions sources corresponding to an entity. For example, the emissions optimizer system 112 determines unit numbers 304*a* indicating a number of units of each physical emissions source type. To illustrate, the emissions optimizer system 112 determines how many delivery drivers are associated with the entity, how many miles the delivery drivers drive during a given time period (e.g., daily, monthly, or yearly), a number of cooking or manufacturing units are associated with the entity, etc. The emissions optimizer system 112 thus determines how many units of a given emissions source the entity uses (or is associated with) during operations of the entity.

In addition to the unit numbers 304*a*, the emissions optimizer system 112 also determines source categories 304*b* corresponding to the plurality of physical emissions sources. In some embodiments, each source category produces a specific amount of emissions of one or more emission types. For instance, the emissions optimizer system 112 determines a source category for each physical emissions source based on a source type of the physical emissions source. To illustrate, the emissions optimizer system 112 determines a first source category for a first physical emissions source, a second source category for a second physical emissions source, etc. In additional embodiments the emissions optimizer system 112 determines a plurality of different physical emissions sources for a single source category. Accordingly, the emissions optimizer system 112 assigns a corresponding source category to each unit of a particular type of physical emissions source.

According to one or more embodiments, the emissions optimizer system 112 determines emissions values 306 based on the physical emissions source data 304. Specifically, the emissions optimizer system 112 accesses an emissions database 308 including data for determining how the emissions production of each unit of a particular physical emissions source. To illustrate, the emissions optimizer system 112 accesses the emissions database 308 from a third-party system that determines emissions values according to a standard emissions protocol (e.g., a greenhouse gas protocol "GHG"). In some embodiments, the emissions optimizer system 112 the emissions database 308 includes data indicating emissions values of a plurality of emission types for each unit of each source category. Thus, the emissions optimizer system 112 determines total emissions values produced by the physical emissions sources corresponding to the entity by utilizing the unit numbers 304*a*, the source categories 304*b*, and the emissions database 308.

In one or more embodiments, the emissions optimizer system 112 also determines constraints 310 in connection with modifying physical emissions sources for an entity. In particular, the constraints 310 include indications of requirements or limitations that determine boundaries for modifying physical emissions sources. As illustrated in FIG. 3, the constraints 310 include source constraints 310*a*, budget constraints 310*b*, and additional constraints 310*c*. For instance, the source constraints 310*a* indicate requirements of numbers or types of physical emissions sources (e.g., a minimum unit number of one or more physical emissions sources or source categories). In one or more embodiments, the source constraints 310*a* indicate that an entity has goals that require a certain number of units of one or more emissions sources. Additionally, the source constraints 310*a* can include business constraints related to expansion plans for meeting future sales/operational targets that the entity does not want to compromise (e.g., expanding from 10 locations to 20 locations within 2 years).

In one or more embodiments, the budget constraints 310*b* include financial requirements of operations. For example, the budget constraints 310*b* indicate that an entity has certain financial capabilities for implementing changes related to reducing emissions. To illustrate, the budget constraints 310*b* can include one or more budget limitations for adding or replacing physical emissions sources, such as a budget limitation for replacing a limited number of gas powered vehicles with electric vehicles.

In some embodiments, the additional constraints 310*c* include other constraints not covered by the source constraints 310*a* or the budget constraints 310*b*. Specifically, an entity may have certain operations or actions that the entity does not want to compromise. For instance, an entity may have a certain amount of travel that entity leadership or employees are required to perform within a specific time period that limits the amount of travel reduction available for reducing emissions. The additional constraints 310*c* can also indicate constraints based on obligations that the entity has with one or more other entities.

In one or more embodiments, the emissions optimizer system 112 determines the physical emissions source data 304, the constraints 310, and/or the target emissions values 312 based on user-defined values. For example, the emissions optimizer system 112 determines the physical emissions source data 304, the constraints 310, and/or the target emissions values 312 based on user input provided via one or more client devices associated with the entity. In some instances, the emissions optimizer system 112 also utilizes default values for the physical emissions source data 304, the constraints 310, and/or the target emissions values 312.

In alternative embodiments, the emissions optimizer system 112 automatically determines the physical emissions source data 304, the constraints 310, and/or the target emissions values 312. To illustrate, the emissions optimizer system 112 utilizes a machine-learning model that processes entity data (e.g., operations data) indicating details associated with the entity. The emissions optimizer system 112 determines the physical emissions source data 304, the constraints 310, and/or the target emissions values 312 by estimating numbers of physical emissions sources, future/target physical emissions sources, and/or target emissions values. The emissions optimizer system 112 can also utilize data associated with similar entities to generate estimates of the physical emissions source data 304, the constraints 310, and/or the target emissions values 312.

For example, the emissions optimizer system 112 utilizes a neural network (e.g., a convolutional neural network, recurrent neural network, deep neural network) to generate features representing an entity and a plurality of additional entities (e.g., based on the entity data). The neural network can determine a similarity between the entity and additional entities (e.g., via entity/feature matching). In one or more embodiments, the emissions optimizer system 112 determines physical emissions source data, constraints, and/or target emissions values for the entity based on one or more similar entities.

In one or more embodiments, the emissions optimizer system 112 utilizes the neural network to determine a similarity between the entity and one or more additional entities. For instance, the emissions optimizer system 112 obtains a plurality of attributes of each entity including, but not limited to, entity size, entity type, entity profits/expenses, location, or operations data. The emissions optimizer system 112 utilizes the neural network to encode the attributes (and any learned relationships among the attributes) to generate feature vectors representing the entities. The emissions optimizer system 112 determines similar entities based on distances between the feature vectors (e.g., based on the distances between feature vectors in a feature space). In one or more implementations, the emissions optimizer system 112 determines that the smaller the distance between feature vectors in the features space the greater the similarity between the entities represented by the feature vectors.

In response to determining one or more similar entities to the entity, the emissions optimizer system 112 determines the physical emissions source data, constraints, and/or target emissions values for the entity based on entity data associated with the similar entity/entities. In particular, the emissions optimizer system 112 retrieves entity data from a similar entity and determines corresponding data for an entity based on the retrieved data. To illustrate, in response to determining that a first entity has a similar entity size and entity type as a second entity, the emissions optimizer system 112 utilizes the neural network to determine missing data or estimated data associated with the first entity based on retrieved data for the second entity. In addition, the emissions optimizer system 112 can determine missing/estimated data (or modifications to the entity data) associated with the first entity by averaging corresponding data from a plurality of similar entities (e.g., a weighted average of data from the N most similar entities based on corresponding feature representations). In some instances, the emissions optimizer system 112 also compares the entity data for the first entity to similar entities and notifies the first entity in response to detecting significant deviations from similar entities (e.g., indicating a possible error in the entity data).

As illustrated in FIG. 3, the emissions optimizer system 112 also determines target emissions values 312 for modifying physical emissions sources corresponding to an entity. In one or more embodiments, the emissions optimizer system 112 determines the target emissions values 312 based on emissions goals for a future time period for the entity. For example, the emissions optimizer system 112 determines that emissions goals for reducing emissions produced by the entity by a specific amount/percentage within a specific amount of time (e.g., −20% emissions within two years). In some embodiments, the emissions optimizer system 112 thus determines the target emissions values 312 based on the emissions values 306 and the emissions goals for the entity (e.g., based on one or more percentages of the emissions values 306).

After determining the emissions values 306, the constraints 310, and the target emissions values 312 the emissions optimizer system 112 utilizes the modified gradient descent model 300 to generate the action recommendations 302. Specifically, the emissions optimizer system 112 utilizes the modified gradient descent model 300 to iteratively adjust the emissions values 306 corresponding to the physical emissions sources toward the target emissions values 312. Furthermore, the emissions optimizer system 112 utilizes the modified gradient descent model 300 to adjust the emissions values 306 while meeting the constraints 310.

As mentioned, the number of variables involved in adjusting emissions values for large numbers of physical emissions sources of different types and given various constraints can be very large. To illustrate, even small entities can be associated with tens or hundreds of physical emissions sources, while large entities can be associated with tens of thousands or hundreds of thousands of physical emissions sources. Accordingly, optimizing variables for such large numbers of variables is impractical (or even impossible) utilizing conventional manual methods (e.g., via spreadsheet tools) given current software/hardware limitations. Additionally, adjusting certain emissions values (or corresponding physical emissions sources) can affect other emissions values or violate one or more constraints during optimization, resulting in a complex emissions optimization problem. The emissions optimizer system 112 thus utilizes the modified gradient descent model 300 to generate an emissions reduction plan 314 including a plurality of emissions values modifications 314a-314n. For example, the emissions optimizer system 112 generates a first emission values modification 314a for modifying a first physical emissions source (or source category), a second emissions values modification 314b for modifying a second physical emissions source (or source category), etc. Each emissions values modification includes a plan to meet a specific number of units of a particular physical emissions source for meeting the target emissions values.

In one or more additional embodiments, the modified gradient descent model 300 also determines whether the target emissions values are possible given the emissions values 306 and the constraints 310. In particular, an entity may have established constraints and/or target emissions values that are incompatible with each other. Accordingly, the emissions optimizer system 112 utilizes the modified gradient descent model 300 to determine whether to modify one or more of the constraints 310 and/or target emissions values 312 in addition to any emissions values modifications.

Figure 4:
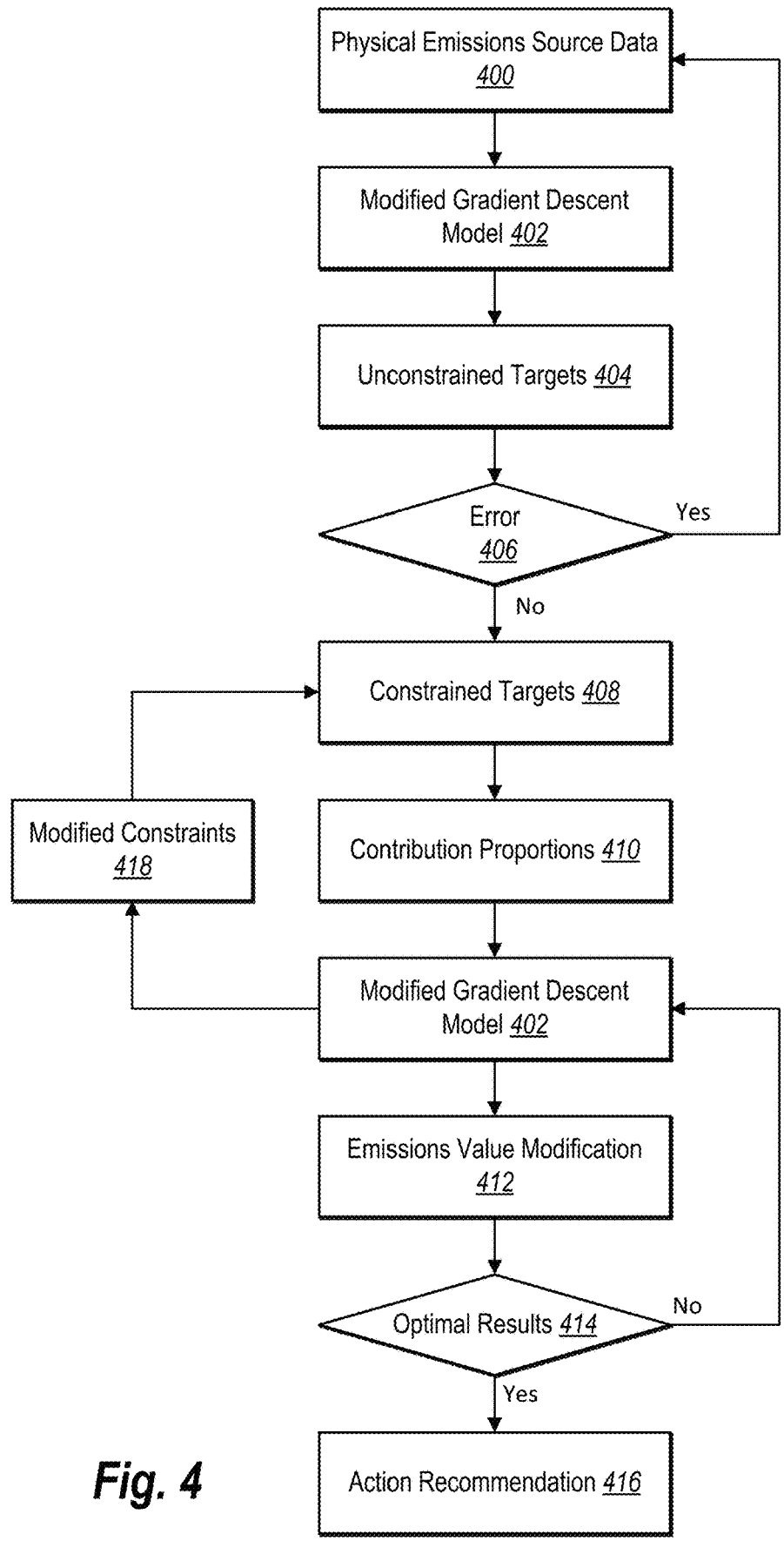
FIG. 4 illustrates an example of the emissions optimizer system utilizing a modified gradient descent model to iteratively adjust emissions values for physical emissions sources in accordance with one or more implementations.

In one or more embodiments, the emissions optimizer system 112 utilizes a modified gradient descent model including a multi-variable objective algorithm such as a mixed-integer linear programming model to iteratively adjust emissions values for a plurality of physical emissions sources. FIG. 4 illustrates a process by which a modified gradient descent model determines emissions value modifications for generating action recommendations to reduce emissions for an entity. Specifically, the emissions optimizer system 112 utilizes the modified gradient descent model to iteratively adjust emissions values for physical emissions sources according to target emissions values and one or more constraints.

As illustrated in FIG. 4, the emissions optimizer system 112 determines physical emissions source data 400 for an entity. In particular, as previously mentioned, the physical emissions source data 400 includes information indicating unit numbers and source types of physical emissions sources corresponding to the entity. For example, the physical emissions source data 400 includes data representing one or more previous time periods (e.g., one or several years of recent data for the entity). In connection with determining the physical emissions source data 400, the emissions optimizer system 112 also determines emissions values based on the physical emissions source data 400.

According to one or more embodiments, the emissions optimizer system 112 utilizes a modified gradient descent model 402 to process the physical emissions source data 400. For example, the emissions optimizer system 112 utilizes the modified gradient descent model 402 according to a set of unconstrained targets 404. Specifically, the emissions optimizer system 112 provides the modified gradient descent model 402 with no constraints to first determine whether the physical emissions source data 400 or emissions values are erroneous or whether the modified gradient descent model or other component has an error. To illustrate, the modified gradient descent model 402 iterates through the emissions values to determine if there is any combination of emissions values that meet the unconstrained targets 404. If the modified gradient descent model 402 does not output any results, the emissions optimizer system 112 determines that there is an error 406 and returns to the physical emissions source data 400 to find and correct the error with the physical emissions source data 400, the corresponding emissions values, and/or the modified gradient descent model 402.

For instance, the modified gradient descent model 402 includes an iterative optimization algorithm that determines a local minimum of a function given a number of variables. In particular, the modified gradient descent model 402 iteratively adjusts a set of initial parameter values to minimize a given cost function. In one or more embodiments, the modified gradient descent model 402 finds the local minimum of a function by performing a plurality of steps proportional to the negative of a gradient, which measures the change in weights relative to the change in error (e.g., a partial derivative with respect to a plurality of input variables). According to one or more embodiments, in response to determining that the gradient reaches a local minimum (e.g., the cost function is as small as possible), the modified gradient descent model 402 terminates. Furthermore, in one or more embodiments, the modified gradient descent model 402 determines a number of results according to the initial parameters and a learning rate. Thus, in some embodiments, the emissions optimizer system 112 modifies the speed of the modified gradient descent model 402 by adjusting the number of input parameters and/or the learning rate associated with the modified gradient descent model 402.

If the modified gradient descent model 402 outputs results, the emissions optimizer system 112 determines that the data/model are not erroneous moves to the next steps (i.e., optimizing the emissions values for the entity). As illustrated, after determining that there is no error in the physical emissions source data 400, the corresponding emissions values, and/or the modified gradient descent model 402, the emissions optimizer system 112 provides a set of constrained targets 408 to the modified gradient descent model 402. In particular, the emissions optimizer system 112 utilizes entity-provided constraints and/or estimated constraints (e.g., via a machine-learning model) to optimize the emissions values.

In one or more embodiments, the emissions optimizer system 112 determines contribution proportions 410 corresponding to the plurality of physical emissions sources to the emissions values. For instance, the emissions optimizer system 112 determines a total emissions value of emissions produced by the physical emissions sources. In additional embodiments, the emissions optimizer system 112 determines total emissions values for a plurality of emission types produced by the physical emissions sources. The emissions optimizer system 112 determines percentage weights of the physical emissions sources (e.g., a weight for each source category) relative to the total emissions value (or to the total emissions value for each emission type). Accordingly, the emissions optimizer system 112 determines how much each physical emissions source (or source category) contributes to the total emissions produced by the entity.

In one or more additional embodiments, the emissions optimizer system 112 determines contributions of the physical emissions sources to one or more additional parameters. For example, the emissions optimizer system 112 determines contribution proportions of the physical emissions sources to total costs associated with the physical emissions sources (e.g., according to predefined cost values assigned based on a source category, emissions, or other data associated with a physical emissions source). To illustrate, the emissions optimizer system 112 determines total costs associated with operations of objects and/or actions corresponding to the physical emissions sources. The emissions optimizer system 112 determines how much each of the physical emissions sources (or source categories) contributes to the total cost.

After determining the contribution proportions 410 of the physical emissions sources to the total emissions value(s) and/or to one or more additional parameters, the emissions optimizer system 112 utilizes the modified gradient descent model 402 to optimize the emissions values for the physical emissions sources based on the constrained targets 408. Specifically, the emissions optimizer system 112 utilizes the modified gradient descent model 402 to iteratively adjust emissions values for the physical emissions sources according to the contribution proportions 410. For instance, the emissions optimizer system 112 ranks/sorts the physical emissions sources according to the contribution proportions 410, such as by sorting the physical emissions sources from highest contribution proportion to lowest contribution proportion.

The emissions optimizer system 112 utilizes the modified gradient descent model 402 to adjust emissions values associated with the physical emissions sources according to the contribution proportions 410. To illustrate, the modified gradient descent model 402 selects the physical emissions source with the highest contribution proportion and adjusts an emissions value of the selected physical emissions source. For example, the modified gradient descent model 402 determines a base unit value for the selected physical emissions source indicating a current/most recent number of units of the physical emissions source. The modified gradient descent model 402 further determines a maximum number of units and a minimum number of units based on one or more constraints provided to the modified gradient descent model 402.

In one or more embodiments, the modified gradient descent model 402 utilizes a search model (e.g., a binary search model) to select an initial value corresponding to an emissions value modification 412 and step the value up or down based on the generated results. With each selected value, modified gradient descent model 402 determines whether costs associated with the value provide optimal results 414 based on one or more thresholds. To illustrate, the modified gradient descent model 402 determines whether emissions values corresponding to the selected value result in emissions values that are lower than a previous iteration. In additional embodiments, the modified gradient descent model 402 determines whether the emissions values corresponding to the selected value result in emissions values lower than a constraint (e.g., an entity-defined emissions goal). In some embodiments, the modified gradient descent model 402 can also (or alternatively) determine whether the selected value lowers the overall emissions values while being higher than one or more constraints (e.g., a minimum unit number).

If the modified gradient descent model 402 generated results and determines that the selected value meets each of the above-indicated thresholds, the emissions optimizer system 112 utilizes the modified gradient descent model 402 to iteratively determine one or more new values while performing the above process again. Specifically, the modified gradient descent model 402 utilizes the search model to iteratively select new values (e.g., by stepping up or down) and determine whether the new value meet the threshold(s). Once the modified gradient descent model 402 determines that a selected value provides results that do not meet one or more of the above-indicated thresholds, the emissions optimizer system 112 may determine that the selected value corresponds to optimal results 414 for the emissions value modification 412.

As illustrated in FIG. 4, the emissions optimizer system 112 generates an action recommendation 416 for providing to the entity to perform the emissions value modification 412. For example, the emissions optimizer system 112 generates the action recommendation 416 including an indication to modify a number of units of a corresponding physical emissions source. In some embodiments (e.g., as described with respect to FIG. 5), the emissions optimizer system 112 utilizes the emissions values to generate the action recommendation 416 in a user-friendly format.

In one or more embodiments, the emissions optimizer system 112 utilizes the modified gradient descent model 402 to continue optimizing the plurality of physical emissions sources until meeting the constrained targets 408. In particular, the emissions optimizer system 112 determines, after optimizing a particular physical emissions source, whether the optimized emissions values meet the constrained targets 408. If not, the emissions optimizer system 112 utilizes the modified gradient descent model 402 to select another physical emissions source (e.g., the next highest contributing physical emissions source) and optimize the newly selected physical emissions source. The emissions optimizer system 112 continues optimizing the physical emissions sources and generating action recommendations for emissions value modifications until meeting the constrained targets 408.

In some embodiments, if the emissions optimizer system 112 iterates through all physical emissions sources and does not meet the constrained targets 408, the emissions optimizer system 112 determines that the constraints and/or the target emissions values are unrealistic (i.e., not possible given the physical emissions sources). Accordingly, in one or more embodiments, the emissions optimizer system 112 utilizes the modified gradient descent model 402 to adjust the emissions values of the physical emissions sources with only the constraints (e.g., with no user-defined target emissions values). If the modified gradient descent model 402 generates valid results, the emissions optimizer system 112 repeats the optimization process for the physical emissions sources to optimize the emissions values as much as possible toward a set of model-defined target emissions values (e.g., default target emissions values).

If the modified gradient descent model 402 does not generate valid results, the emissions optimizer system 112 determines that one or more of the constraints are not possible. According to one or more embodiments, the emissions optimizer system 112 relaxes one or more constraints to determine modified constraints 418 (e.g., by incrementally reducing or increasing specific constraint values) and utilizes the modified gradient descent model 402 to optimize the results, if possible. The emissions optimizer system 112 provides one or more action recommendations in connection with the modified constraints 418. For instance, the emissions optimizer system 112 generates one or more action recommendations to modify one or more physical emissions sources and one or more action recommendations based on the modified constraints 418 for use in determining the constrained targets 408. Furthermore, if the emissions optimizer system 112 determines that the modified gradient descent model 402 is unable to produce valid results with the modified constraints 418, the emissions optimizer system 112 modifies the target emissions values and repeats the process until determining target emissions values that produce valid results.

As mentioned, in one or more embodiments, the emissions optimizer system 112 generates action recommendations in a user-friendly format. FIG. 5 illustrates a diagram of the emissions optimizer system 112 generating natural language recommendations. In particular, the emissions optimizer system 112 utilizes a natural language processing engine 500 to convert or transform emissions values modifications 502 to a plurality of natural language action recommendations 504a-504n. More specifically, the emissions optimizer system 112 utilizes the natural language processing engine 500 to convert data associated with the emissions values modifications 502 into the natural language action recommendations 504a-504n.

In one or more embodiments, the emissions optimizer system 112 utilizes the natural language processing engine 500 to process the emissions values modifications 502. For example, the emissions optimizer system 112 determines physical emissions source data and an emissions values modification for a physical emissions source. The emissions optimizer system 112 utilizes the natural language processing engine 500 to generate one or more natural language phrases or sentences that describe the physical emissions source data and the emissions values modification.

In one or more embodiments, the natural language processing engine 500 includes a neural network that converts structured data into natural language phrases. To illustrate, the natural language processing engine 500 includes a language-based neural network such as a generative transformer-based neural network or a long short-term memory neural network to extract relationships between data points and convert the extracted relationships into natural language phrases referencing the data points. The natural language processing engine 500 converts the physical emissions source data and emissions value modifications to generate natural language phrases indicating one or more actions to achieve a desired result.

For example, the natural language processing engine 500 determines relationships between values in physical emissions source data. In one or more embodiments, the natural language processing engine 500 also determines relationships between initial physical emissions source data and modified physical emissions source data (e.g., based on differences between initial emissions values and modified emissions values). The natural language processing engine 500 converts the relationships to natural language phrases by generating sentences or phrases indicating the relationships or differences.

As discussed above, in one or more embodiments, the emissions optimizer system 112 utilizes a deep-learning based natural language processing model (e.g., an NLP model) to determine intent classifications associated with instances of natural language input. For instance, the emissions optimizer system 112 utilizes a natural language processing engine 500 or NLP model including an encoder layer and a decoder layer.

As mentioned above, the encoder layer receives a structured data input (e.g., the emissions values modifications) and parses the input into words, characters, or character n-grams. In one or more embodiments, the emissions optimizer system 112 embeds the words, characters, or character n-grams into one or more input vectors. For example, the emissions optimizer system 112 can encode the input utilizing one-hot encoding, or a neural embedding based on word semantics.

In one or more embodiments, the emissions optimizer system 112 feeds the generated input vector for each word in the input to the encoder layer including bi-directional LSTM layers. The bi-directional LSTM layers of the encoder layer can each include a first layers and second layers. In at least one embodiment, the first and second layers include series of LSTM units that are organized bi-directionally. In one or more embodiments, the bi-directional organization divides the LSTM units into two directions. For example, half of the LSTM units are organized 'forward,' or in a sequence over increasing sequence instances, while the other half of the LSTM units are organized 'backward,' or in a sequence over decreasing sequence instances. By organizing the LSTM units in opposite directions, the encoder layer can simultaneously utilize content information from the past and future of the current sequence instance to inform the output of the encoder layer.

Generally, each LSTM unit includes a cell, an input gate, an output gate, and a forget gate. As such, each LSTM unit can "remember" values over arbitrary time intervals while regulating the flow of information into and out of the unit. Thus, for example, a first LSTM unit in the first layer of the encoder layer can analyze an input vector encoding the a first input token. A second LSTM unit in the first layer can analyze an input vector encoding a second input token as well as a feature vector from the first LSTM unit (e.g., a latent feature vector encoding significant features of the first input or other previous inputs in the sequence).

The natural language processing engine 500 sequentially models the input, where latent feature vectors of previous layers (corresponding to previous text inputs and training text inputs) are passed to subsequent layers, and where hidden states of text inputs are obtained to generate vectors for each word embedded into the input vector. Each of the layers of the encoder layer further determine relationships between words embedded into the input vector and other contextual information to generate output vectors.

For example, the encoder layer can output a sequence vector that feeds directly into the decoder layer. The decoder layer is configured similarly to the encoder layer with multiple bi-directional LSTM layers. In response to receiving the sequence vector from the encoder layer, the layers of the decoder layer can output a predicted phrase or sentence indicating one or more actions to achieve a desired result based on the physical emissions source data and emissions value modifications.

To illustrate, the emissions optimizer system 112 determines that the physical emissions source data indicates a number of units and/or emissions values for a physical emissions source or an emission type for a previous year and an emissions values modification that indicates a new number of units and/or emissions values for a future time period. The emissions optimizer system 112 utilizes the natural language processing engine 500 to generate a sentence indicating the change in values from the previous time period to the future time period. As an example, the resulting natural language recommendation includes "Reduce natural gas from 15 K in the base year (2020) to 13 K in the target year (2022)." In an additional example, the emissions optimizer system 112 also provides natural language action recommendations in connection with specific business actions such as "Increase electric vehicles from 14 in the base year (2020) to 18 in the target year (2022)." In additional embodiments, the emissions optimizer system 112 also generates natural language recommendations including budgetary implications of emissions values modifications.

In one or more embodiments, the emissions optimizer system 112 utilizes user inputs to further train the natural language processing engine 500. To illustrate, the emissions optimizer system 112 utilizes a selected natural language action recommendation to further train the natural language processing engine 500 for future recommendations (e.g., as a positive example to steer the natural language processing engine 500 to produce similar recommendations/styles in the future). Additionally, the emissions optimizer system 112 utilizes the unselected recommendations as negative examples for training the natural language processing engine 500.

Figure 6A:
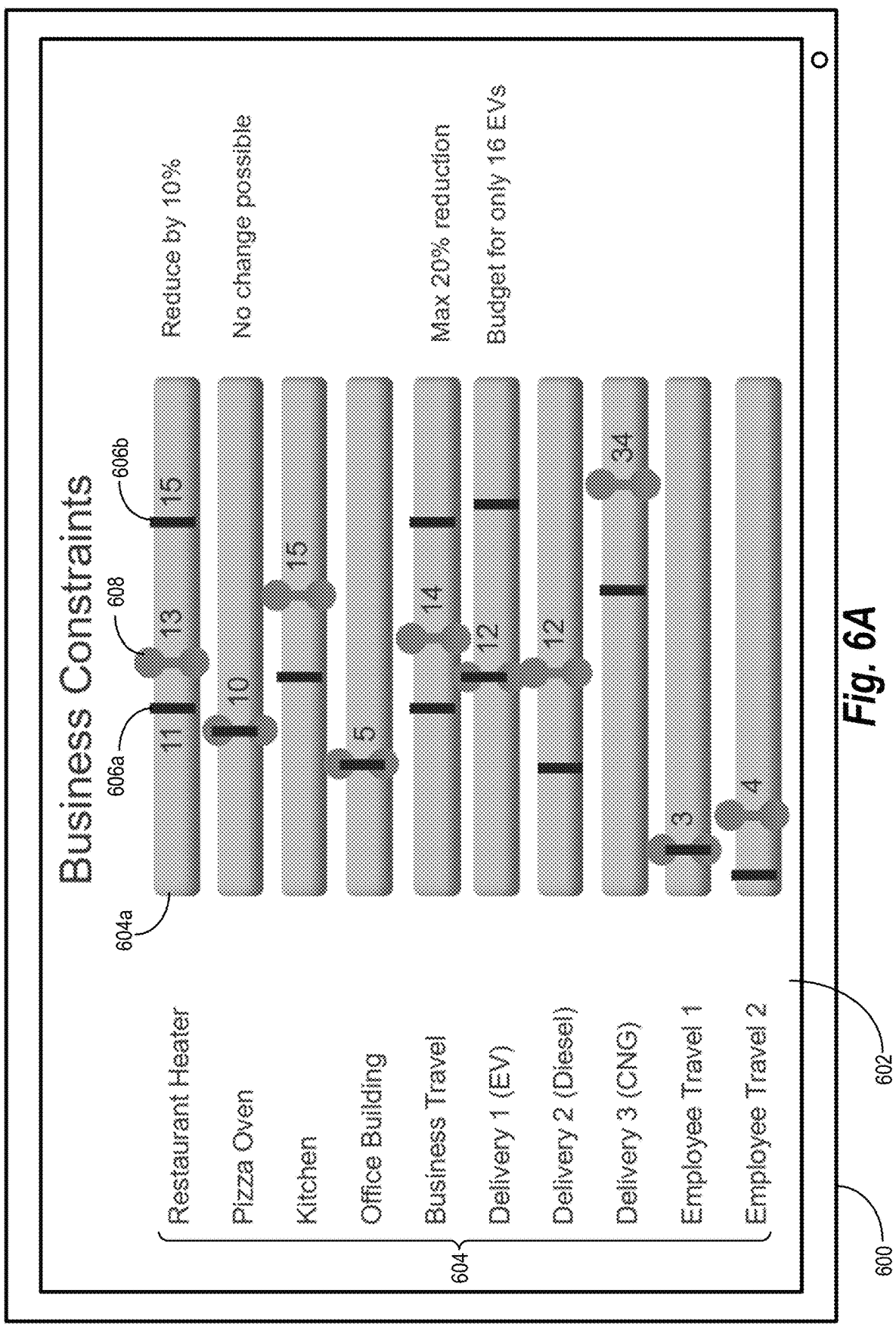
FIGS. 6A-6B illustrate examples of graphical user interfaces including graphical user interface elements for setting a plurality of constraints and a plurality of target emissions values in accordance with one or more implementations.
Figure 6B:
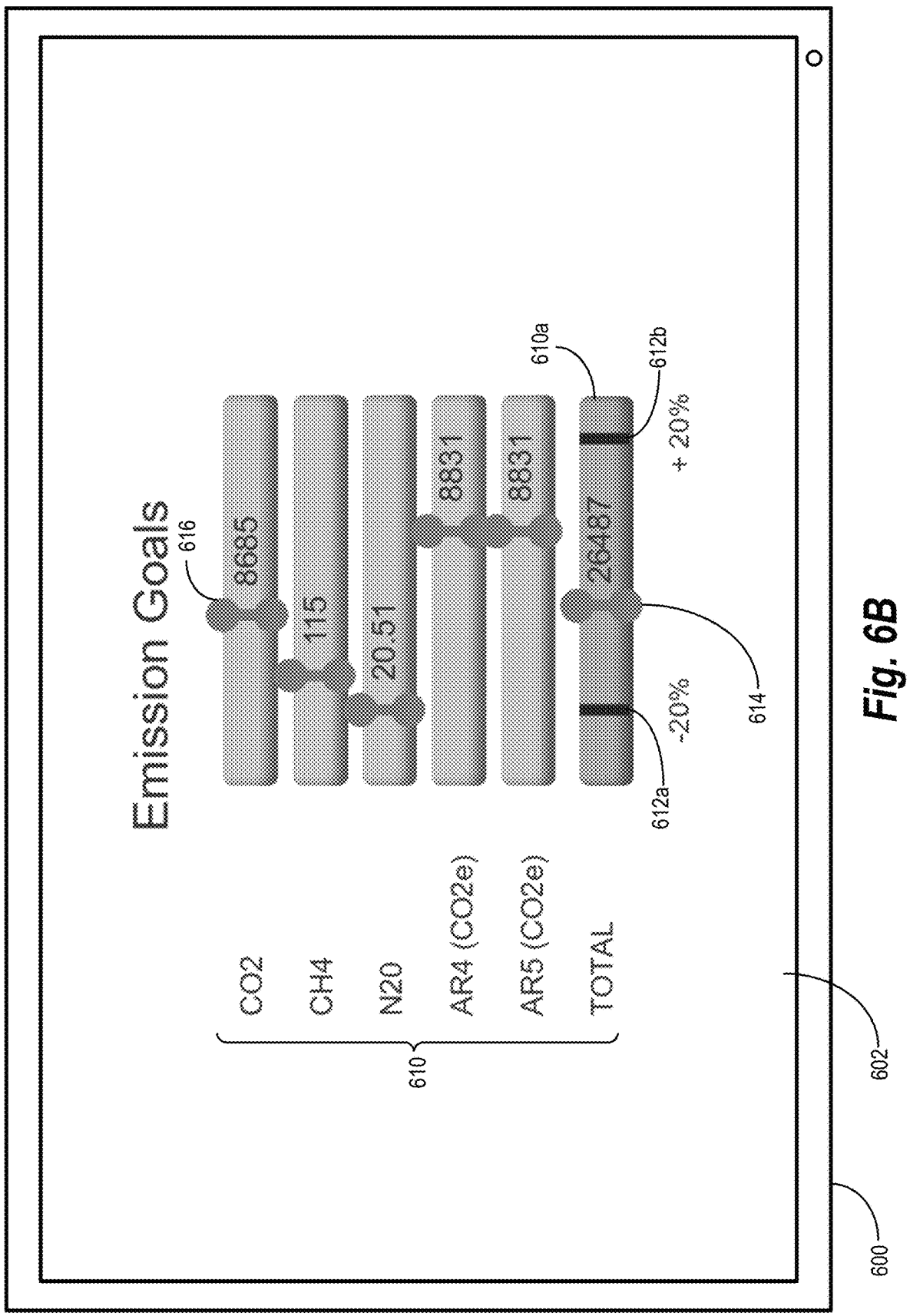

As previously described, in one or more embodiments, the emissions optimizer system 112 determines constraints for determining emissions values modifications. For example, the emissions optimizer system 112 receives user-defined constraints and/or target emissions values for an entity. FIGS. 6A-6B illustrate graphical user interfaces for setting constraints and target emissions values. Specifically, FIG. 6A illustrates a graphical user interface for setting a plurality of constraints for a plurality of physical emissions sources. FIG. 6B illustrates a graphical user interface for setting one or more target emissions values for specific emission types.

FIG. 6A illustrates a client device 600 presenting a graphical user interface of a client application 602 for various entity management operations. Specifically, the client device 600 displays a plurality of graphical user interface elements 604 corresponding to a plurality of different physical emissions sources. For instance, the client device 600 displays a graphical user interface element 604*a* corresponding to a first physical emissions source (e.g., a "Restaurant Heater") for an entity. In connection with the graphical user interface element 604*a*, the client device 600 receives user input to define one or more constraints for the first physical emissions source.

To illustrate, the client device 600 displays a minimum constraint 606*a* indicating a minimum number of units, minimum costs, or other minimum value associated with the first physical emissions source. The client device 600 also displays a maximum constraint 606*b* indicating a maximum number of units, maximum costs, or other maximum value associated with the first physical emissions source. Accordingly, the emissions optimizer system 112 determines various constraints associated with the physical emissions sources based on user inputs via the client device 600.

As illustrated in FIG. 6A, in one or more embodiments, the client device 600 also displays results generated by the emissions optimizer system 112. In particular, the emissions optimizer system 112 utilizes a modified gradient descent model to generate a plurality of emissions values modifications based on the provided constraints. For instance, the emissions optimizer system 112 generates an emissions value modification for the first physical emissions source based on the minimum constraint 606a and the maximum constraint 606b. The emissions optimizer system 112 provides the emissions value modification to the client device 600, which displays a modification element 608 indicating the emissions value modification. As shown, the emissions optimizer system 112 generated the emissions value modification to include a value between the minimum constraint 606a and the maximum constraint 606b, which provides an easily verifiable, user friendly format for viewing modifications to perform relative to the physical emissions sources.

FIG. 6B illustrates the client device 600 presenting an additional graphical user interface of the client application 602. In particular, the client device 600 displays a plurality of graphical user interface elements 610 corresponding to a plurality of different emission types. For instance, the client device 600 displays a graphical user interface element 610a corresponding to a total emissions representing a combination of all emission produced by physical emissions sources for the entity. In connection with the graphical user interface element 610a, the client device 600 receives user input to define one or more constraints for the total emissions.

To illustrate, the client device 600 displays a minimum constraint 612a indicating a minimum total emissions value for emissions produced by physical emissions sources for the entity. The client device 600 also displays a maximum constraint 612b indicating a maximum total emissions value for emissions produced by physical emissions sources for the entity. In some embodiments, the client device 600 also receives user inputs for setting one or more constraints associated with one or more of the different emission types (minimum/maximum emissions values for a first emission type, minimum/maximum emissions values a second emission type, etc.) The emissions optimizer system 112 thus determines various constraints associated with the emissions produced by the physical emissions sources for the entity based on one or more user inputs via the client device 600.

As illustrated in FIG. 6B, in some embodiments, the client device 600 also displays results generated by the emissions optimizer system 112. In particular, the emissions optimizer system 112 utilizes a modified gradient descent model to generate a target total emissions value. For instance, the emissions optimizer system 112 utilizes the modified gradient descent model to iteratively adjust emissions values for a plurality of physical emissions sources to determine one or more emissions values modifications based on provided constraints (e.g., based on constraints for the physical emissions sources and the emissions values). The emissions optimizer system 112 provides a resulting total emissions value to the client device 600, which displays a total emissions element 614 indicating the resulting total emissions based on one or more emissions value modifications. Additionally, in one or more embodiments, the client device 600 displays emission type elements (e.g., a first emission type element 616) indicating results generated for individual emission types in connection with the resulting total emissions value.

In one or more additional embodiments, the emissions optimizer system 112 provides additional methods for users to indicate constraints and/or target emissions values. For instance, rather than the graphical user interface elements of FIGS. 6A-6B, the emissions optimizer system 112 can provide slider elements, text fields, or other graphical user interface elements. In additional embodiments, the emissions optimizer system 112 utilizes one or more machine-learning models to determine one or more constraints for an entity. Furthermore, after determining one or more predicted constraints utilizing machine-learning models, the emissions optimizer system 112 can also provide the predicted constraints to a client device for confirmation and/or adjustment by a user associated with the entity.

Figure 7:
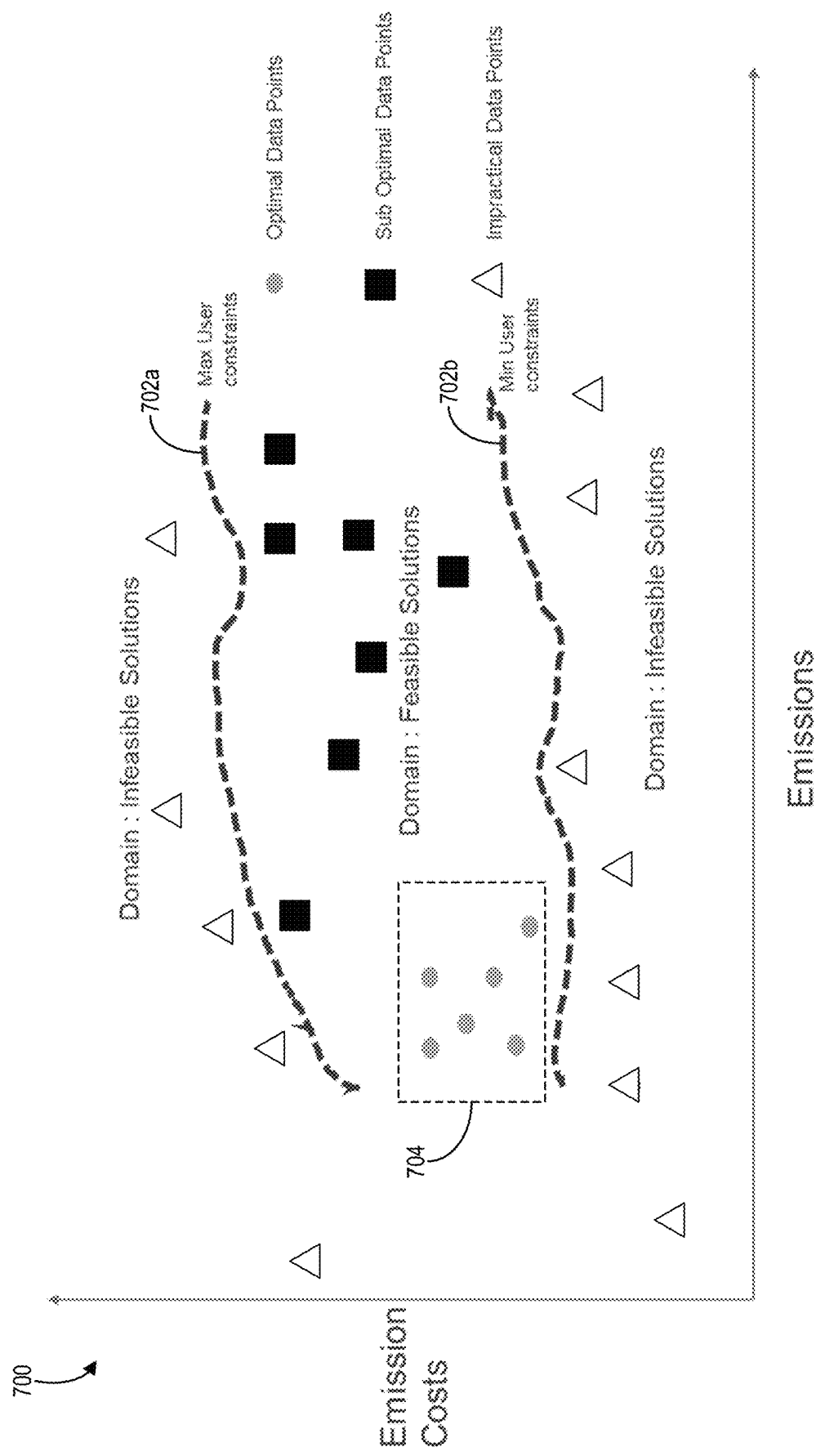
FIG. 7 illustrates examples of a plurality of sampled data points generated by the emissions optimizer system utilizing a modified gradient descent model in accordance with one or more implementations.

FIG. 7 illustrates a graph diagram 700 of a plurality of results generated via a plurality of iterations of a modified gradient descent model in connection with a plurality of physical emissions sources, a plurality of constraints, and one or more target emissions values. In one or more embodiments, as mentioned, the emissions optimizer system 112 utilizes the modified gradient descent model to iteratively adjust emissions values for a plurality of physical emissions sources according to the constraints and the target emissions value(s). Specifically, the graph diagram 700 represents solutions generated by the modified gradient descent model of emissions (e.g., emissions values) for a plurality of physical emissions sources relative to source costs (e.g., according to predefined emission cost per unit of physical emissions source).

For example, as illustrated in FIG. 7, the emissions optimizer system 112 determines maximum user constraints 702a and minimum user constraints 702b indicating maximum and minimum values, respectively, of source costs. After determining the constraints, the emissions optimizer system 112 utilizes the modified gradient descent model to iteratively adjust emissions values of a plurality of physical emissions sources toward one or more target emissions values. As the modified gradient descent model adjusts the emissions values, the emissions optimizer system 112 also determines whether the resulting emission values meet the maximum user constraints 702a and the minimum user constraints 702b.

To illustrate, the emissions optimizer system 112 determines that results above the maximum user constraints 702a or below the minimum user constraints 702b are infeasible solutions. Furthermore, the emissions optimizer system 112 determines that results that meet the maximum user constraints 702a and the minimum user constraints 702b are feasible solutions. The emissions optimizer system 112 utilizes the modified gradient descent model to iteratively adjusts the emissions values until determining one or more optimal results. Specifically, as illustrated in FIG. 7, the emissions optimizer system 112 determines feasible solutions that meet the constraints but do not meet one or more target emissions values. Accordingly, the emissions optimizer system 112 continues adjusting emissions values to determine optimal results 704 including feasible solutions that meet the constraints and also meet the one or more target emissions values.

As illustrated in FIG. 7, the emissions optimizer system 112 is able to quickly and efficiently determine feasible solutions that meet a set of constraints and target emissions values by adjusting emissions values for individual physical emissions sources in an iterative process. As shown, the solution space can include a very large number of possible solutions (e.g., hundreds or thousands or more) depending on the number of physical emissions sources and constraints. By utilizing the modified gradient descent model with an efficient search model, the emissions optimizer system 112 reduces the number of solutions generated to a small fraction of the total possible solutions. Accordingly, the emissions optimizer system 112 significantly improves the efficiency of a computing device by reducing the computing resources required to generate results that reduce emissions for a plurality of physical emissions sources of the entity.

According to one or more embodiments, the emissions optimizer system 112 determines a plurality of results that meet constraints and also meet target emissions values. For example, the emissions optimizer system 112 determines a plurality of different combinations of emissions value modifications for a plurality of physical emissions sources that each meets the constraints and target emissions values. To illustrate, the emissions optimizer system 112 utilizes the modified gradient descent model to generate a plurality of different results by processing the physical emissions sources according to different criteria (e.g., based on contribution proportions relative to emissions values, contribution proportions relative to source costs, or other sorting methods). The emissions optimizer system 112 provides action recommendations for each result in the optimal results 704.

FIGS. 8A-8F illustrate chart diagrams of an example in which the emissions optimizer system 112 utilizes a modified gradient descent model to generate emissions value modifications for a plurality of physical emissions sources. For example, FIG. 8A illustrates a chart diagram 800 including a plurality of physical emissions sources corresponding to an entity. In one or more embodiments, the physical emissions sources correspond to specific source categories (e.g., "fuel type," "mobile combustion," "transport"). Additionally, the chart diagram 800 includes entity usage including heaters, ovens, buildings, travel, etc., along with the emissions sources such as gas, electricity, fuel, etc. Furthermore, as illustrated in FIG. 8A, the emissions optimizer system 112 determines unit costs, unit sizes, and unit (e.g., "mmBTU," "gal," "vehicle-mile") for each physical emissions source.

In one or more embodiments, as illustrated in FIG. 8A, the emissions optimizer system 112 also determines physical emissions source data for one or more previous time periods. Specifically, the emissions optimizer system 112 determines a number of units for each emissions source for a previous time period (e.g., the most recent year) corresponding to the entity. For example, the emissions optimizer system 112 accesses a database or repository including information about the number of units of the plurality of physical emissions sources for the entity. The physical emissions source data allows the emissions optimizer system 112 to determine emissions, costs, etc., resulting from the plurality of physical emissions sources for the entity.

To illustrate, FIG. 8B illustrates a chart diagram 802 of a plurality of emission types produced by the physical emissions sources for the entity. For instance, the emissions optimizer system 112 accesses a database including emissions data to determine emissions values of a plurality of emission types produced by each physical emissions source. To illustrate, the database includes the amount of emissions generated by a single unit of each physical emissions source. As shown in FIG. 8B, each unit of physical emissions source produces different emission types based on the source category of the physical emissions source. In some embodiments, the emissions optimizer system 112 determines specific emission types based on the entity, such as based on a region of the entity, a size of the entity, or other attributes of the entity, according to local regulations and/or goals of the entity.

FIG. 8C illustrates a chart diagram 804 including constraints for a modified gradient descent model and results generated by the modified gradient descent model based on the constraints and further based on the physical emissions sources of FIG. 8A. In one or more embodiments, the emissions optimizer system 112 determines minimum and maximum source values (e.g., numbers of units of corresponding physical emissions sources). The emissions optimizer system 112 utilizes the modified gradient descent model to generate emissions value modifications by iteratively adjusting the emissions values for the physical emissions sources (e.g., by adjusting the number of units for the physical emissions sources up or down). The chart diagram 804 includes the results from the modified gradient descent model ("Optimizer Output") indicating that the modified gradient descent model produced results within the provided constraints.

FIG. 8D illustrates a chart diagram 806 including comparisons of emissions values and source costs between the base year (2020) and the results of the modified gradient descent model for the entity for a future time period (e.g., 2022). Specifically, the chart diagram 806 includes source costs of the base year according to the number of units of the plurality of physical emissions sources and the source costs associated with the physical emissions sources. In addition, the chart diagram 806 includes the contribution proportions of the physical emissions sources as percentages of the total source costs and the total emissions values for the base year and the modified gradient descent model results. As illustrated, the emission source "CNG—Light-duty vehicles" includes the highest contribution to the total source costs, while the emissions source "Blast Furnace Gas" corresponding to the restaurant heater produces the highest contribution to the total emissions. Furthermore, as illustrated in the chart diagram 806, the results of the modified gradient descent model include higher source costs relative to the source costs of the base year.

While the modified gradient descent model generated results with higher costs for the future time period, the chart diagram 806 also indicates that the modified gradient descent model produced results that reduce emissions for the future time period. Specifically, as illustrated in FIG. 8D, the emissions optimizer system 112 utilizes the modified gradient descent model to adjust emissions values for some of the physical emissions sources relative to the base year. For example, the emissions optimizer system 112 generates emissions value modifications that result in a decrease of total emissions values from 28,133.14 to 26,534.17—a total decrease of 5.6%.

FIG. 8E illustrates a chart diagram 808 including the total emissions values for the plurality of physical emissions sources based on the number of units of each physical emissions source for the base year. Additionally, the chart diagram 808 includes the total emissions values of each emission type contributing to the total emissions values. FIG. 8F illustrates a chart diagram 810 including the total emissions values for the plurality of physical emissions sources based on the number of units of each physical emissions source for the future time period (e.g., results generated by the modified gradient descent model). The chart diagram 810 includes the total emissions values of each emission type contributing to the total emissions values. As shown in FIGS. 8E-8F, the emissions optimizer system 112 provides improved emissions reductions across the plurality of emission types by adjusting emissions values for the plurality of physical emissions sources in accordance with the constraints and one or more target emissions values.

Figure 9:
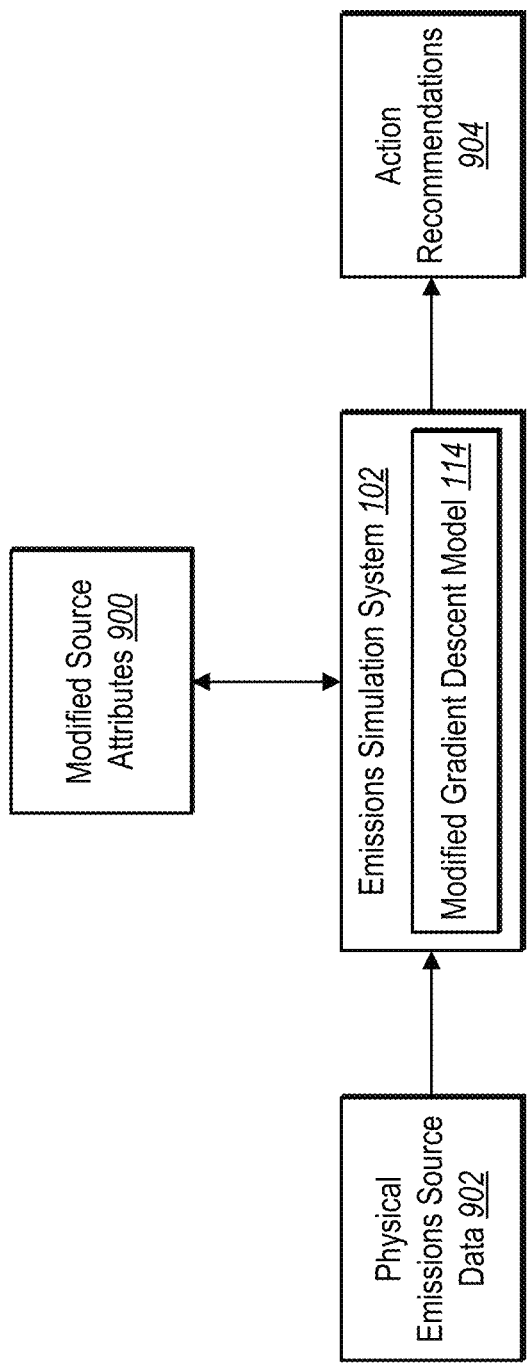
FIG. 9 illustrates an example of an overview of a process of the emissions simulator system utilizing a modified gradient descent model to generate action recommendations for modifying physical emissions sources via a plurality of simulations in accordance with one or more implementations.

As mentioned, the emissions simulator system 102 performs simulations for a variety of different scenarios to determine the impact of modifications to physical emissions sources on emissions values. FIG. 9 illustrates an overview of the emissions simulator system 102 processing modified source attributes 900 of physical emissions source data 902 to generate action recommendations 904. In particular, the emissions simulator system 102 utilizes the modified gradient descent model 114 (e.g., the modified gradient descent model of the emissions optimizer system 112 in FIG. 1) to determine modified target emissions values for a plurality of different scenarios. The emissions simulator system 102 generates the action recommendations 904 from the modified target emissions values.

According to one or more embodiments, the emissions simulator system 102 determines the physical emissions source data 902 in connection with a plurality of physical emissions sources for an entity. To illustrate, as previously described, the emissions simulator system 102 determines a number and a type of each of a plurality of physical emissions sources corresponding to the entity. In additional embodiments, the physical emissions source data 902 includes additional source attributes corresponding to the physical emissions sources such as, but not limited to, emissions costs or other costs, source categories, emissions types, or other attributes of the physical emissions sources.

In additional embodiments, the emissions simulator system 102 determines the modified source attributes 900 from the physical emissions source data 902. For example, the modified source attributes 900 include, but are not limited to, attributes such as the emissions costs or other costs, source categories, or emissions types different than initial source attributes of the physical emissions sources. To illustrate, the emissions simulator system 102 determines the modified source attributes 900 to include a different cost for a particular physical emissions source that may affect an entity's ability to meet one or more initial target emissions values due to one or more constraints. The emissions simulator system 102 thus determines one or more source attributes for the physical emissions sources that are different than one or more initial source attributes of the physical emissions sources in connection with generating emissions value modifications.

According to one or more embodiments, the emissions simulator system 102 utilizes the modified gradient descent model 114 to generate the action recommendations 904 based on the modified source attributes 900. Specifically, the emissions simulator system 102 utilizes the modified gradient descent model 114 to perform a plurality of simulations for a plurality of scenarios to determine whether the entity can achieve the initial target emissions values given the modified source attributes 900 consistent with constraints provided by the entity. For example, as described in more detail below with respect to FIG. 10 and FIGS. 11A-11B, the emissions simulator system 102 generates the action recommendations 904 for modifying the physical emissions sources based on differences between the initial target emissions values and modified target emissions values resulting from the modified gradient descent model 114. Additionally, in one or more embodiments, the emissions simulator system 102 utilizes an iterative process to determine the modified source attributes 900, perform simulations based on the modified source attributes 900, update the modified source attributes 900 based on the simulations, etc.

Figure 10:
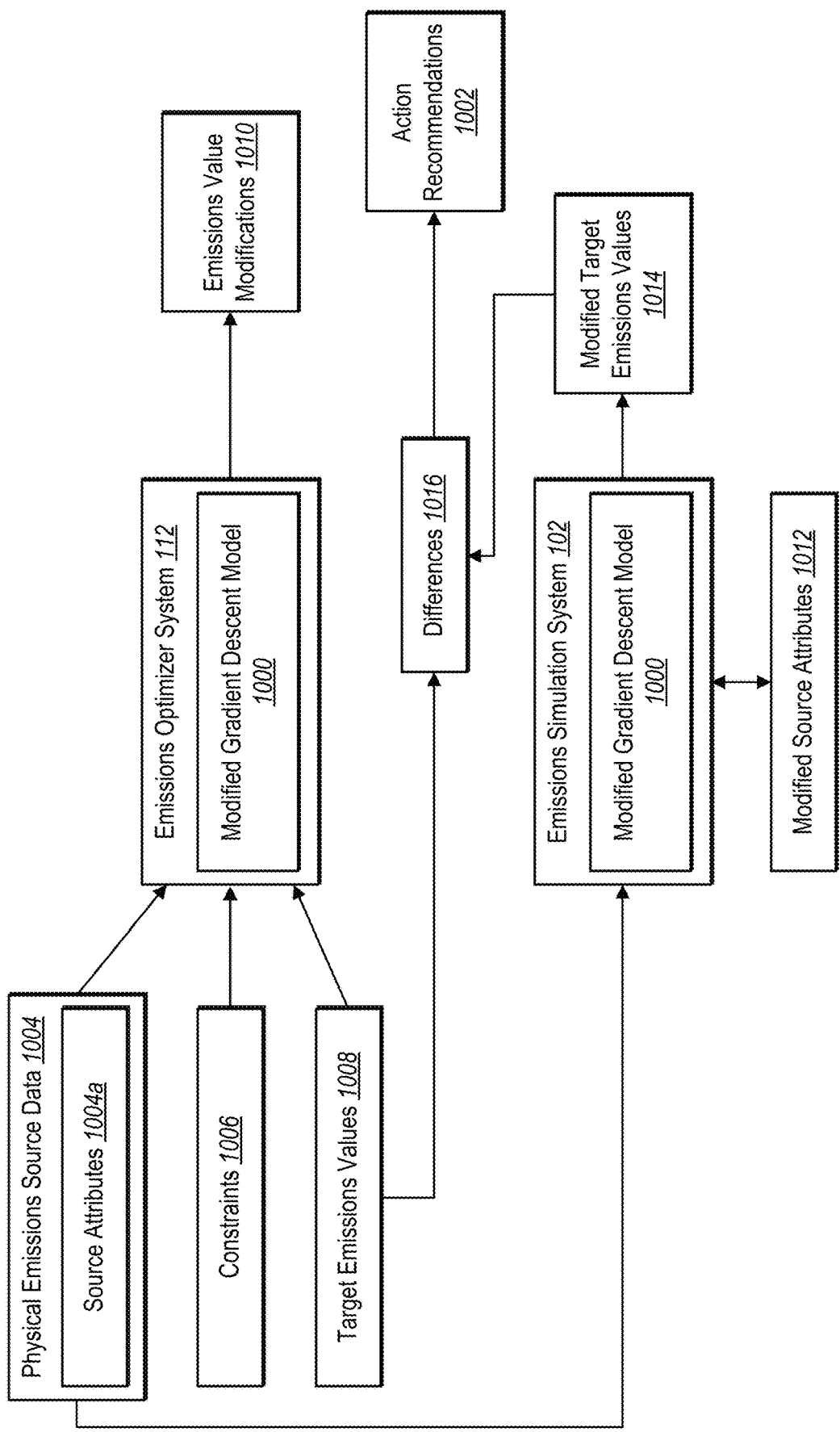
FIG. 10 illustrates an example of a detailed process of the emissions simulator system utilizing a modified gradient descent model to generate action recommendations for modifying physical emissions sources via a plurality of simulations in accordance with one or more implementations.

FIG. 10 illustrates a diagram of a detailed process of the emissions simulator system 102 generating action recommendations for modifying physical emissions sources based on a plurality of simulations. In particular, the emissions optimizer system 112 utilizes a modified gradient descent model 1000 to process initial data associated with a plurality of physical emissions sources. Additionally, the emissions simulator system 102 utilizes the modified gradient descent model 1000 to perform a plurality of simulations for a plurality of scenarios and generate action recommendations based on the simulations relative to the initial results generated by the emissions optimizer system 112. For example, the emissions simulator system 102 utilizes the modified gradient descent model to generate action recommendations 1002 to modify physical emissions sources for meeting emissions goals under a variety of different circumstances.

As illustrated in FIG. 10, the emissions optimizer system 112 determines physical emissions source data 1004 corresponding to an entity. For example, the emissions optimizer system 112 determines source attributes 1004a including attributes that determine an impact of a plurality of physical emissions sources on one or more defined goals for the entity such as those described with respect to FIG. 3 above. To illustrate, the source attributes 1004a include, but are not limited to, a number of units of each physical emissions source, source categories of the physical emissions sources, emissions values for the plurality of physical emissions sources based on an emissions protocol, monetary (or other) costs associated with the plurality of physical emissions sources, or types of emissions produced by physical emissions sources.

In one or more embodiments, the emissions optimizer system 112 determines constraints 1006 in connection with determining whether to modify physical emissions sources. For example, as previously indicated, the constraints 1006 include indications of requirements or limitations such as source constraints, budget constraints, or additional constraints. In at least some embodiments, the constraints 1006 include budget constraints for individual physical emissions sources or source categories or for overall financial expenditures related to the physical emissions sources.

According to one or more embodiments, the emissions optimizer system 112 determines target emissions values 1008 for the entity. For instance, the emissions optimizer system 112 determines an initial target emissions value for total emissions produced in connection with the physical emissions sources. In additional embodiments, the emissions optimizer system 112 determines initial target emissions values for individual physical emissions sources or source categories. Thus, the emissions optimizer system 112 determines the target emissions values 1008 in connection with an emissions goal for the entity.

After determining the physical emissions source data 1004, the constraints 1006, and the target emissions values 1008, the emissions optimizer system 112 generates emissions value modifications 1010. In particular, the emissions optimizer system 112 utilizes the modified gradient descent model 1000 to generate the emissions value modifications 1010. For example, as previously described, the emissions optimizer system 112 utilizes the modified gradient descent model 1000 to iteratively adjust emissions values associated with the physical emissions sources to determine how to modify the physical emissions sources (e.g., by modifying the corresponding emissions values) to achieve the target emissions values 1008 given the constraints 1006 and physical emissions source data 1004.

In one or more embodiments, in connection with the emissions optimizer system 112 utilizing the modified gradient descent model 1000 to evaluate the physical emissions source data 1004 in connection with the constraints 1006 and target emissions values 1008 for an entity, the emissions simulator system 102 performs simulations to evaluate additional scenarios for the entity. Specifically, as illustrated in FIG. 10, the emissions simulator system 102 modifies the physical emissions source data 1004 (e.g., the source attributes 1004a) to obtain modified source attributes 1012. More specifically, the emissions simulator system 102 determines the modified source attributes 1012 based on possible changes to the physical emissions sources over time. To illustrate, the emissions simulator system 102 determines the modified source attributes 1012 by modifying costs or source categories of one or more of the physical emissions sources based on individual, recurring, or permanent events/ changes to one or more operations of the entity. For instance, the emissions simulator system 102 determines changes to a physical emissions source based on changes to transportation or shipping, rising or falling costs associated with a particular physical emissions source (e.g., natural gas), or other possible changes.

According to one or more embodiments, the emissions simulator system 102 utilizes the modified source attributes 1012 to determine modified target emissions values 1014. In particular, the emissions simulator system 102 utilizes the modified gradient descent model 1000 of the emissions optimizer system 112 (or a separate modified gradient descent model) to process the modified source attributes 1012. The emissions simulator system 102 performs a plurality of simulations utilizing the physical emissions source data 1004 with the modified source attributes 1012. For instance, the emissions simulator system 102 utilizes the modified gradient descent model 1000 to generate the modified target emissions values 1014 from the modified source attributes 1012 and the unchanged source attributes of the physical emissions source data 1004.

In one or more embodiments, the modified target emissions values 1014 include emissions values (or ranges of emissions values) predicted to be produced by a plurality of physical emissions sources based on the modified gradient descent model 1000 iteratively adjusting the emissions values of the physical emissions sources with the modified source attributes 1012. To illustrate, the emissions simulator system 102 utilizes the modified gradient descent model 1000 to perform a plurality of separate simulations with different combinations of source attributes for possible scenarios to determine the impact of the source attributes on the emissions values produced by the physical emissions sources. For example, the emissions simulator system 102 can determine that the entity is able to achieve the target emissions values 1008 (i.e., the initial/desired target emissions values) in some scenarios but not in other scenarios based on the corresponding simulations. Accordingly, for some scenarios, the modified target emissions values 1014 are the same as the target emissions values 1008, but for other scenarios, the modified target emissions values 1014 are different than the target emissions values 1008. In one or more embodiments, the modified target emissions values 1014 include the same emissions values for one or more specific physical emissions sources or source categories as the target emissions values 1008 and different emissions values for one or more additional physical emissions sources or source categories.

After generating the modified target emissions values 1014 via a plurality of simulations, the emissions simulator system 102 compares the modified target emissions values 1014 to the target emissions values 1008. In particular, the emissions simulator system 102 determines differences 1016 between the modified target emissions values 1014 and the target emissions values 1008. For instance, the emissions simulator system 102 determines, for a given simulation, any differences between the corresponding modified target emissions values and the target emissions values 1008, thus indicating whether the entity is able to achieve the target emissions values 1008 in a particular scenario. The emissions simulator system 102 thus determines the possibility of achieving the target emissions values 1008 for each of the plurality of scenarios based on the simulations processed utilizing the modified gradient descent model 1000.

In one or more embodiments, the emissions simulator system 102 generates the action recommendations 1002 based on the differences 1016. Specifically, the emissions simulator system 102 generates the action recommendations 1002 to perform one or more actions in relation to the physical emissions sources for one or more possible scenarios. To illustrate, the emissions simulator system 102 generates an action recommendation to perform one or more actions including, but not limited to, modifying physical emissions sources, modifying one or more constraints, or modifying one or more target emissions values or goals for a future time period in connection with a possible scenario. The emissions simulator system 102 can also provide a plurality of action recommendations for a plurality of possible scenarios related to different changes in source attributes for the physical emissions sources corresponding to the entity. Thus, the action recommendations provide contingency plans in case of unexpected or possible events that have not occurred, but which may occur, between a present time and a future time period.

Although FIG. 10 illustrates the emissions optimizer system 112 and the emissions simulator system 102 as being separate, in alternative embodiments, the emissions optimizer system 112 and the emissions simulator system 102 are part of a single component. In additional embodiments, the emissions optimizer system 112 and the emissions simulator system 102 form a feedback loop for optimizing emissions values for physical emissions sources and simulating different scenarios with different source attributes. For example, the emissions optimizer system 112 may include the emissions simulator system 102, or the emissions simulator system 102 may include the emissions optimizer system 112. Additionally, the emissions optimizer system 112 and the emissions simulator system 102 may utilize a single modified gradient descent model or separate modified gradient descent models.

Figure 11A:
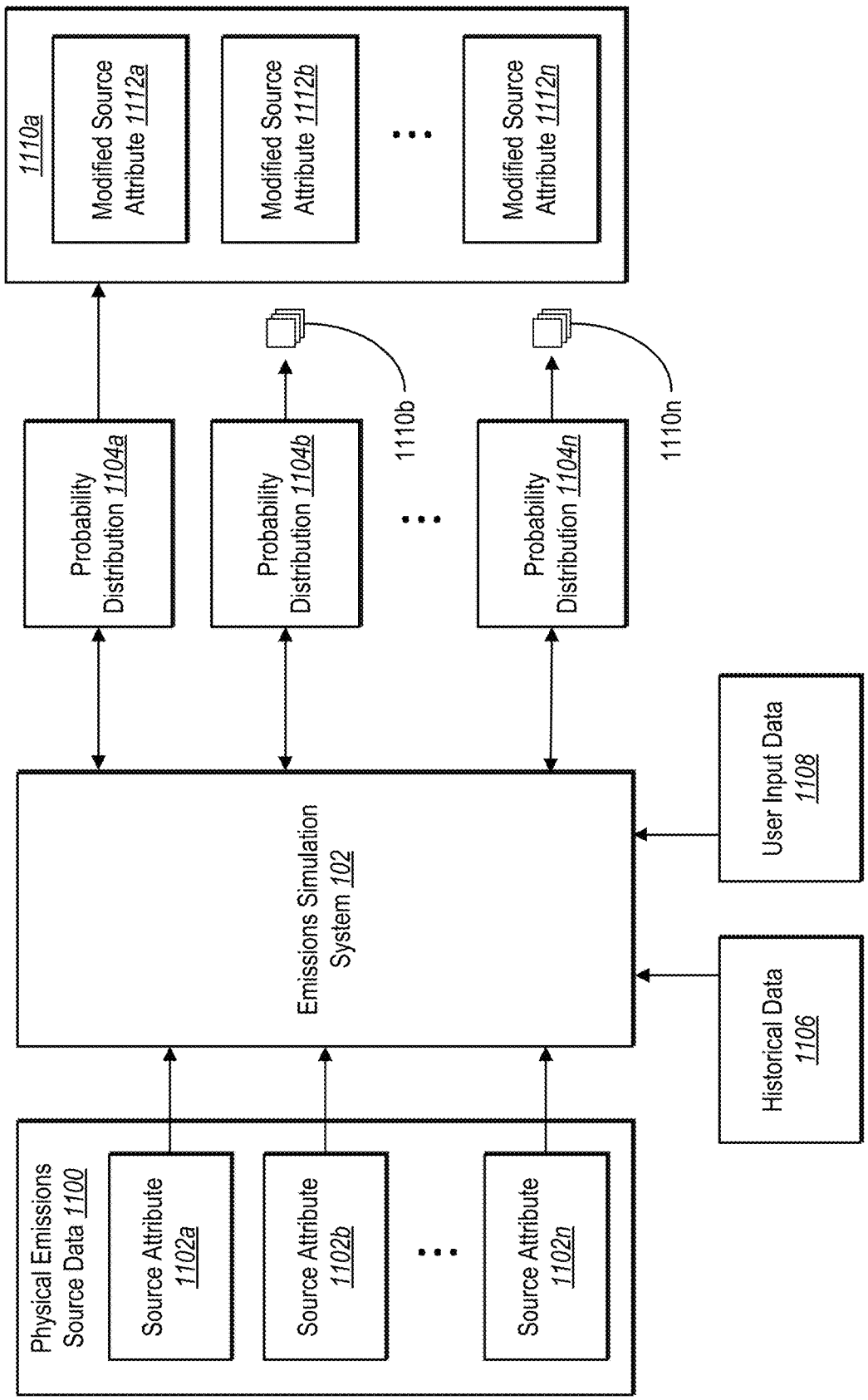
FIGS. 11A-11B illustrate examples of the emissions simulator system determining modified source attributes for physical emissions sources and generating action recommendations based on the modified source attributes in accordance with one or more implementations.
Figure 11B:
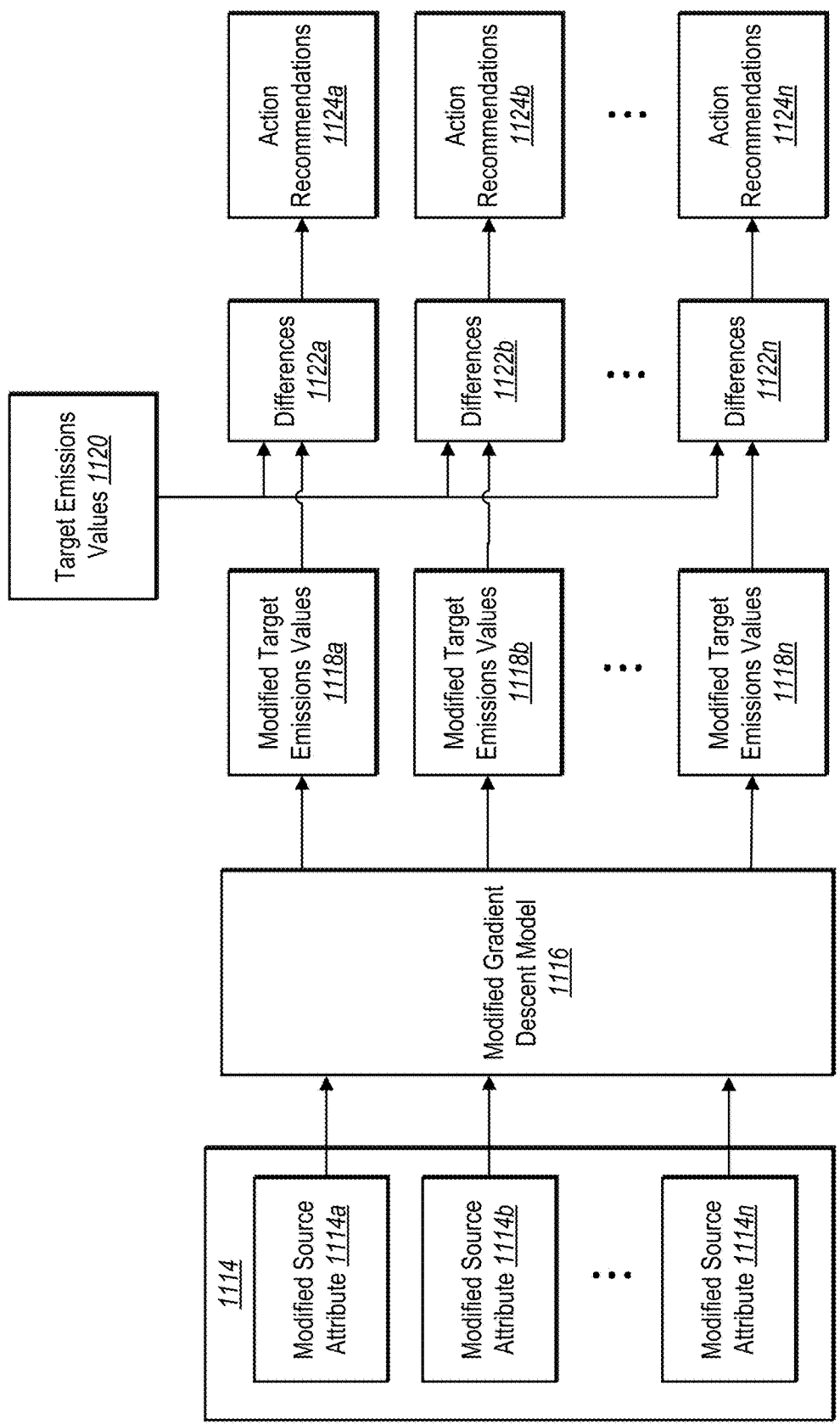

FIGS. 11A-11B illustrate diagrams of the emissions simulator system 102 determining modified source attributes for physical emissions sources and utilizing the modified source attributes to generate action recommendations. In particular, as illustrated in FIG. 11A, the emissions simulator system 102 determines physical emissions source data 1100 for a plurality of physical emissions sources. For instance, the emissions simulator system 102 determines a plurality of source attributes 1102a-1102n corresponding to the physical emissions sources for possibly modifying in connection with different scenarios.

In one or more embodiments, a first source attribute 1102a includes a cost, source category, or other characteristic of a particular physical emissions source or a shared characteristic of a plurality of physical emissions sources. As an example, the emissions simulator system 102 determines an emissions cost or a financial cost of a particular physical emissions source (e.g., natural gas). Additionally, a second source attribute 1102b includes a cost, source category, or other characteristic of an additional physical emissions source or an additional shared characteristic of a plurality of physical emissions sources. The emissions simulator system 102 thus determines the source attributes 1102a-1102n for the plurality of physical emissions sources.

According to one or more embodiments, the emissions simulator system 102 determines a plurality of probability distributions 1104a-1104n that represent the source attributes 1102a-1102n. In particular, the emissions simulator system 102 determines probability distributions that represent ranges of historical and/or probabilistic values of the source attributes 1102a-1102n. For example, the emissions simulator system 102 determines a first probability distribution 1104a representing the first source attribute 1102a and a second probability distribution 1104b representing the second source attribute 1102b. Accordingly, the probability distributions 1104a-1104n can include different distributions of values depending on the corresponding source attributes.

In additional embodiments, the emissions simulator system 102 utilizes historical data 1106 corresponding to the physical emissions source data 1100 to generate the probability distributions 1104a-1104n. For instance, the emissions simulator system 102 analyzes past data corresponding to a previous time period (e.g., 6 months, a year, two years) for the source attributes 1102a-1102n to generate the probability distributions 1104a-1104n. To illustrate, the emissions simulator system 102 determines the first probability distribution 1104a based on historical data for one or more physical emissions sources that include the first source attribute 1102a. Additionally, the emissions simulator system 102 determines the second probability distribution 1104b based on historical data for one or more physical emissions sources that include the second source attribute 1102b. In additional embodiments, the emissions simulator system 102 utilizes one or more additional sources to determine the probability distributions, such as ensemble forecasting, expert opinions, or third-party sources.

Figure 12A:
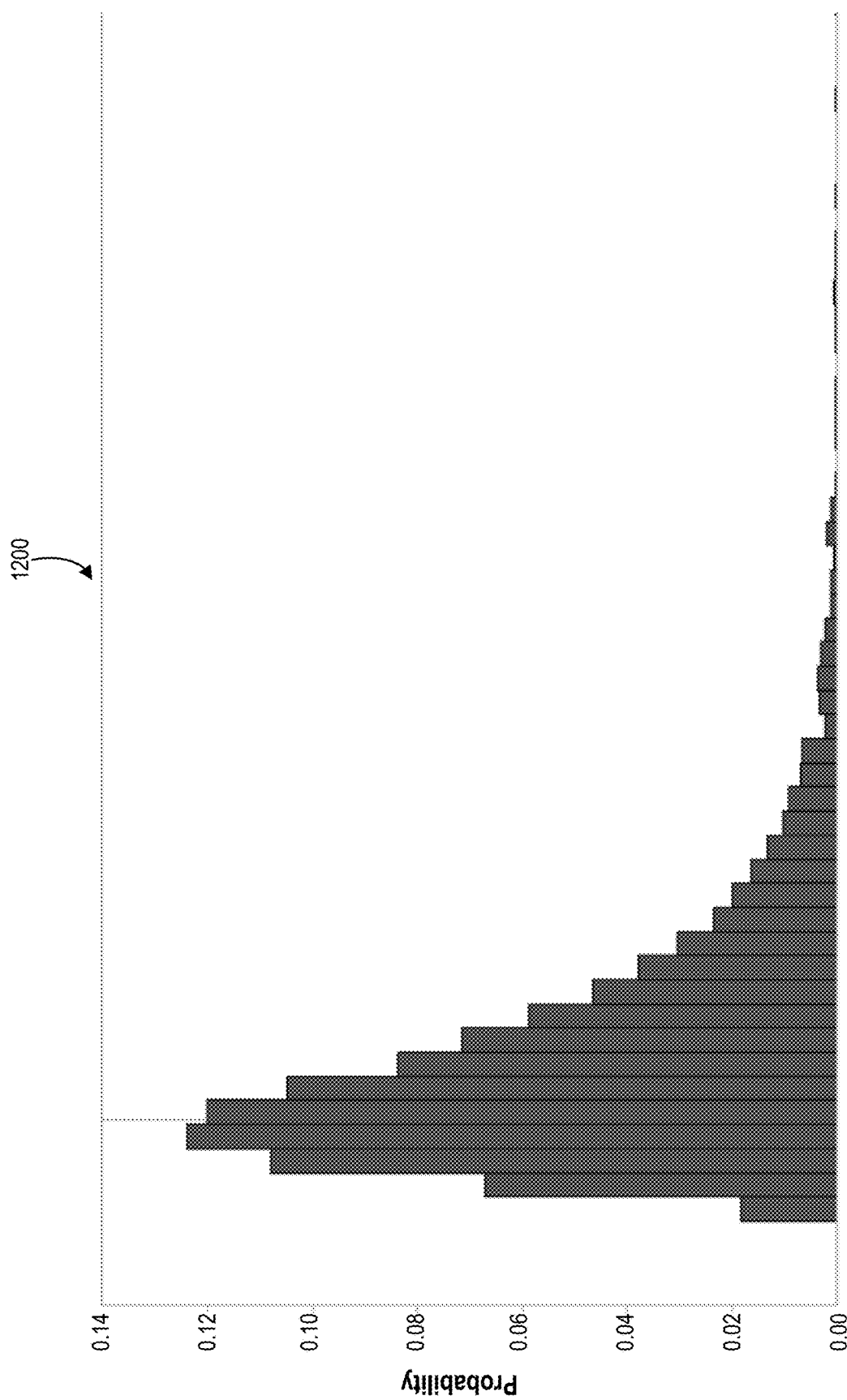
FIGS. 12A-12B illustrate examples of probability distributions for selecting modified source attributes in accordance with one or more implementations.
Figure 12B:
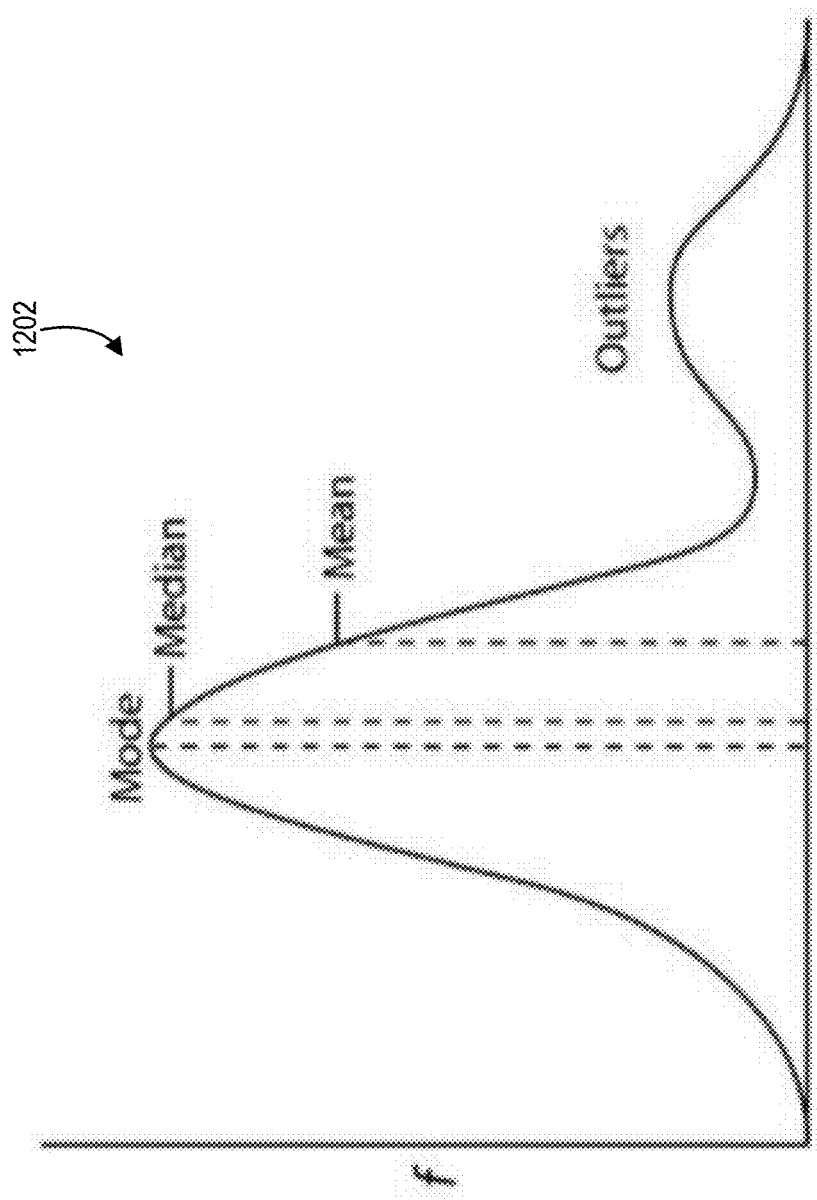

In one or more embodiments, the emissions simulator system 102 also utilizes user input data 1108 to determine the probability distributions 1104a-1104n. Specifically, the emissions simulator system 102 receives user input data indicating specific values relevant to defining a distribution including, but not limited to, a median, a mean, a mode, or a variance. Additionally, in one or more embodiments, the emissions simulator system 102 receives user input data indicating outliers that affect a distribution. FIGS. 12A-12B below illustrate examples of different probability distributions representing source attributes.

As illustrated in FIG. 11A, after determining the probability distributions 1104a-1104n, the emissions simulator system 102 determines modifications to the source attributes for a variety of different scenarios. In particular, the emissions simulator system 102 determines sets of attributes 1110a-1110n based on the probability distributions 1104a-1104n. To illustrate, the emissions simulator system 102 determines a first set of attributes 1110a based on the first probability distribution 1104a. In additional embodiments, the emissions simulator system 102 determines a second set of attributes 1110b based on the second probability distribution 1104b and/or additional sets of attributes based on additional probability distributions depending on the respective scenarios.

In one or more embodiments, the emissions simulator system 102 determines a plurality of modified source attributes utilizing one or more sampling methods. For example, the emissions simulator system 102 determines the first set of attributes including a plurality of modified source attributes 1112a-1112n from the first probability distribution 1104a representing the first source attribute 1102a. Specifically, the emissions simulator system 102 samples the modified source attributes 1112a-1112n as different possible values for replacing the first source attribute 1102a. According to one or more embodiments, the emissions simulator system 102 utilizes a Monte Carlo sampling model to sample the first set of attributes 1110a. In alternative embodiments, the emissions simulator system 102 utilizes a heuristic sampling model to sample the first set of attributes 1110a.

FIG. 11B illustrates that the emissions simulator system 102 utilizes modified source attributes to generate action recommendations for modifying physical emissions sources for a plurality of scenarios. To illustrate, the emissions simulator system 102 utilizes a set of attributes 1114 including a plurality of modified source attributes 1114a-1114n to determine how modifications to one or more source attributes impact emissions values (given a set of constraints) corresponding to the physical emissions sources. In some embodiments, the modified source attributes 1114a-1114n include modified values for a single source attribute to determine how modifications to the single source attribute impact the emissions values. For instance, the emissions simulator system 102 analyzes the impact of a first modified source attribute 1114a corresponding to a source attribute on the emissions values for a first scenario. The emissions simulator system 102 analyzes the impact of a second modified source attribute 1114b corresponding to the source attribute on the emissions values for a second scenario.

In additional embodiments, the modified source attributes 1114a-1114n include modified values for a plurality of source attributes to determine how combined modifications to the plurality of physical emissions sources impact the emissions values. For example, the emissions simulator system 102 analyzes the impact of the first modified source attribute 1114a together with a first additional modified source attribute corresponding to an additional source attribute on the emissions values for a first scenario. The emissions simulator system 102 analyzes the impact of the second modified source attribute 1114b with a second additional modified source attribute corresponding to the additional source attribute (or other source attribute) on the emissions values for a second scenario.

As illustrated in FIG. 11B, the emissions simulator system 102 analyzes the impact of modified source attributes on emissions values for a plurality of physical emissions sources corresponding to an entity by utilizing a modified gradient descent model 1116. In particular, the emissions simulator system 102 utilizes the modified gradient descent model 1116 to iteratively adjust parameters corresponding to the plurality of physical emissions sources based on the modified source attributes 1114a-1114n. In some embodiments, the emissions simulator system 102 also utilizes the modified gradient descent model 1116 to analyze the impact of the modified source attributes 1114a-1114n in connection with one or more constraints for the entity. Accordingly, the emissions simulator system 102 utilizes the modified gradient descent model 1116 to iteratively adjust the parameters based on the modified source attributes 1114a-1114n to attempt to achieve initial target emissions values while meeting the one or more constraints.

According to one or more embodiments, the emissions simulator system 102 utilizes the modified gradient descent model 1116 to generate a plurality of modified target emissions values 1118a-1118n based on the modified source attributes 1114a-1114n in a plurality of simulations. In one or more embodiments, the emissions simulator system 102 utilizes the modified gradient descent model 1116 to prioritize modifying emissions values of physical emissions sources based on one or more proportion measurements for the physical emissions sources. For example, the modified gradient descent model 1116 iteratively adjusts emissions values for physical emissions sources based on the contribution proportions of the physical emissions sources (e.g., combined contribution proportions or per-unit contribution proportions for each physical emissions source) relative to a total emissions value. In additional embodiments, the modified gradient descent model 1116 iteratively adjusts emissions values for physical emissions sources based on the contribution proportions of the physical emissions sources relative to a total cost. Accordingly, the emissions simulator system 102 generates modified target emissions values to represent any combination of source attributes and modified source attributes for the physical emissions sources relative to emissions values and/or costs according to the particular scenario.

As mentioned, the emissions simulator system 102 determines initial target emissions values (in addition to one or more constraints) for processing physical emissions source data utilizing a modified gradient descent model. As illustrated in FIG. 11B, the emissions simulator system 102 determines target emissions values 1120 as the initial target emissions values. In connection with generating the modified target emissions values 1118a-1118n in response to performing a plurality of simulations with the modified source attributes 1114a-1114n, the emissions simulator system 102 compares the modified target emissions values 1118a-1118n to the target emissions values 1120. The emissions simulator system 102 thus determines differences 1122a-1122n between the modified target emissions values 1118a-1118n and the target emissions values 1120. By determining the differences 1122a-1122n, the emissions simulator system 102 also determines the impact of the various modified source attributes on the emissions values (or other parameter) associated with the plurality of physical emissions sources.

As illustrated in FIG. 11B, the emissions simulator system 102 generates action recommendations 1124a-1124n based on the differences 1122a-1122n. Specifically, the emissions simulator system 102 determines one or more actions for modifying physical emissions sources (or goals/constraints related to the physical emissions sources) based on the differences 1122a-1122n between the modified target emissions values 1118a-1118n and the target emissions values 1120. For example, the emissions simulator system 102 determines one or more actions based on first differences 1122a between first modified target emissions values 1118a and the target emissions values 1120. The emissions simulator system 102 generates first action recommendations 1124a to modify the physical emissions sources according to the first differences 1122a. The emissions simulator system 102 can similarly generate a plurality of action recommendations for a plurality of different scenarios according to the corresponding modified target emissions values and their respective differences relative to the target emissions values 1120.

Figure 13A:
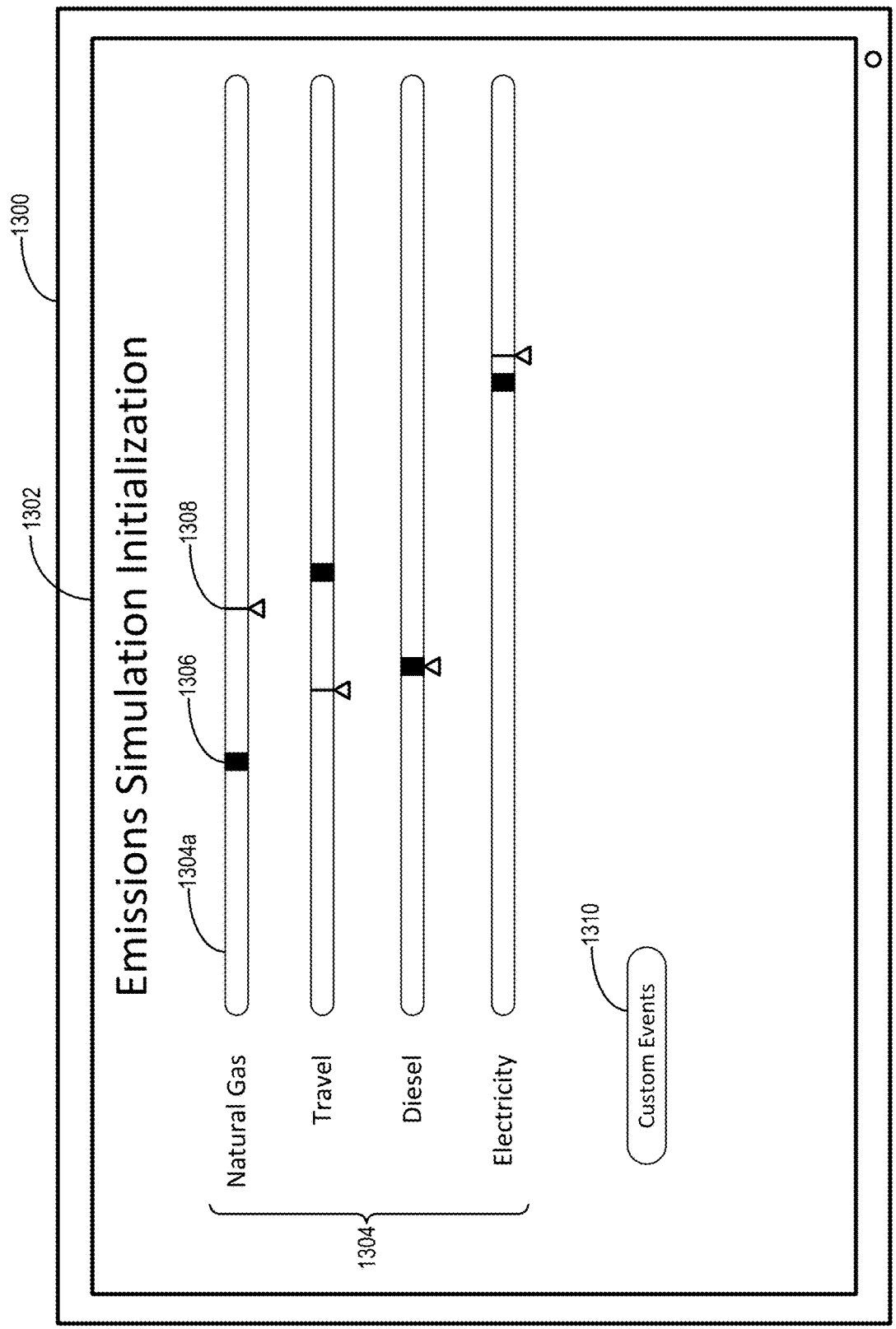
FIGS. 13A-13B illustrate examples of graphical user interfaces including graphical user interface elements for initializing emissions simulations and presenting action recommendations based on the simulations in accordance with one or more implementations.
Figure 13B:
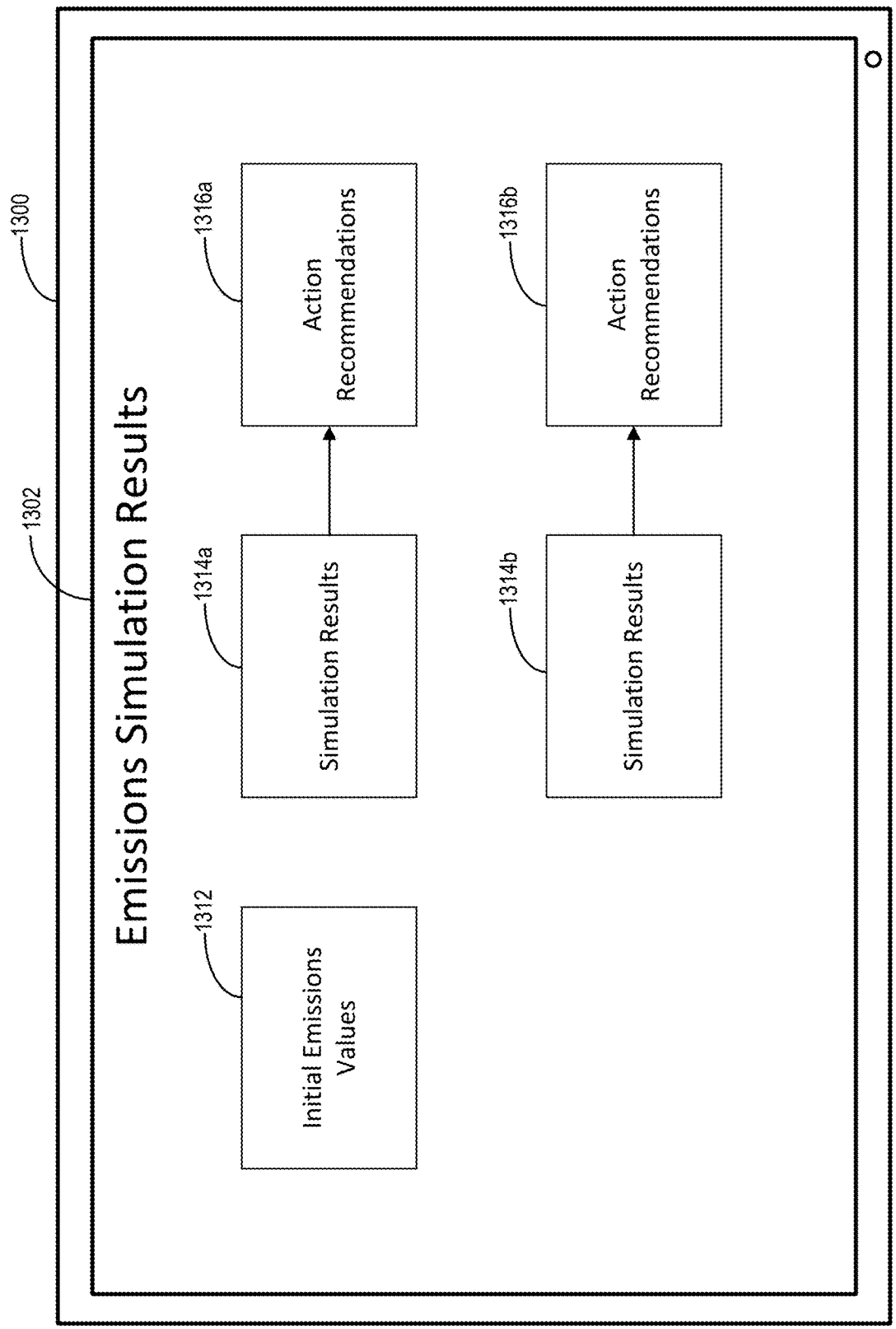

In one or more embodiments, as described in more detail with respect to FIG. 13B, the emissions simulator system 102 utilizes action recommendations to modify physical emissions sources according to one or more modified target emissions values. For instance, the emissions simulator system 102 utilizes an action recommendation to modify one or more physical emissions sources in response to automatically detecting changes to source attributes over time. Alternatively, the emissions simulator system 102 utilizes an action recommendation to modify one or more physical emissions sources in response to a selection of a particular action recommendation.

As mentioned, FIGS. 12A-12B illustrate example probability distributions representing source attributes of physical emissions sources. In particular, FIG. 12A illustrates a first probability distribution 1200 representing a source attribute. More specifically, the first probability distribution 1200 includes a plurality of values corresponding to historical data for the source attribute. In one or more embodiments, as mentioned, the emissions simulator system 102 determines the first probability distribution 1200 based on historical data for one or more physical emissions sources including the source attribute. Accordingly, the emissions simulator system 102 determines a range of possible values for modeling the source attribute based on the past values associated with the source attribute.

To illustrate, if the source attribute includes a cost associated with a particular physical emissions source (e.g., a cost of natural gas), the emissions simulator system 102 determines the historical costs associated with the physical emissions source. The emissions simulator system 102 determines the first probability distribution 1200 based on the historical costs of the physical emissions source. Additionally, the emissions simulator system 102 can change the first probability distribution 1200 by modifying the time period corresponding to the historical data (e.g., by increasing, decreasing, or shifting a time period from which the emissions simulator system 102 obtains the historical data).

In one or more embodiments, the emissions simulator system 102 utilizes a Monte Carlo sampling model to determine modified source attributes. For instance, in response to determining the first probability distribution 1200 of FIG. 12A, the emissions simulator system 102 determines a modified source attribute by randomly sampling a value from the probability distribution. The emissions simulator system 102 continues randomly sampling from the first probability distribution 1200 to determine a plurality of modified source attributes. In some embodiments, the emissions simulator system 102 continues sampling until meeting a threshold number or a threshold coverage of modified source attributes from the first probability distribution 1200. The emissions simulator system 102 thus determines a range of possible values for the corresponding source attribute to substitute during simulations via a modified gradient descent model.

FIG. 12B illustrates a second probability distribution 1202 representing a source attribute. As previously mentioned, in one or more embodiments, the emissions simulator system 102 determines one or more probability distributions representing one or more source attributes based on user input data. For example, the emissions simulator system 102 determines one or more statistical parameters (e.g., mode, median, mean, standard deviation) for constructing the second probability distribution 1202 from user input data. In additional embodiments, the emissions simulator system 102 also determines one or more outliers (e.g., one-time events or infrequently occurring events) for constructing the second probability distribution 1202 from user input data. The emissions simulator system 102 determines the second probability distribution 1202 based on historical data and/or user input data.

In one or more additional embodiments, the emissions simulator system 102 also determines one or more weights associated with possible values of a source attribute. To illustrate, the emissions simulator system 102 determines, based on historical data and/or user input data that the source attribute is expected to change significantly within a short period of time. The emissions simulator system 102 assigns a weight to the expected event, which can affect the second probability distribution 1202. To illustrate, if the emissions simulator system 102 expects natural gas prices to double in a specific future time window, the emissions simulator system 102 adds higher weight for the event during that time period. The emissions simulator system 102 can similarly weight different values of probability distributions based on different events or expected changes in source attributes for sampling modified source attributes.

After, or concurrently with, determining the modified source attributes from the probability distribution (e.g., by randomly sampling from the first probability distribution 1200 and/or the second probability distribution 1202 according to a Monte Carlo sampling model or a heuristic sampling model), the emissions simulator system 102 performs a plurality of simulations. Specifically, the emissions simulator system 102 utilizes a modified gradient descent model to determine simulated emissions values (e.g., modified target emissions values) based on the modified source attributes. In one or more embodiments, as mentioned, the emissions simulator system 102 selects modified attributes (e.g., scenarios) to simulate based on the contribution proportions of the corresponding physical emissions sources relative to costs and/or emissions values. Accordingly, the emissions simulator system 102 improves the efficiency of computing devices performing the simulations by performing simulations with physical emissions source data that is most likely to result in optimal costs/emissions values based on the modified source attributes.

As previously described, in one or more embodiments, the emissions simulator system 102 determines modified source attributes based on user input. For example, the emissions simulator system 102 receives user-defined data points for performing a plurality of simulations based on the modified source attributes. FIGS. 13A-13B illustrate graphical user interfaces for initializing simulations for a plurality of scenarios involving physical emissions sources and displaying results and action recommendations based on a plurality of simulations.

FIG. 13A illustrates a client device 1300 presenting a graphical user interface of a client application 1302 for various entity management operations. In particular, the client device 1300 displays a plurality of graphical user interface elements 1304 corresponding to a plurality of source attributes and/or physical emissions sources. For instance, the client device displays a graphical user interface element 1304a corresponding to a first source attribute for one or more physical emissions sources (e.g., costs for "Natural Gas") for an entity. In connection with the graphical user interface element 1304a, the client device 1300 receives user input to define a custom (e.g., modified) value for the first source attribute.

To illustrate, the client device 1300 displays an initial value indicator 1306 indicating a current value of the first source attribute or a predicted future value of the first source attribute. The emissions simulator system 102 can provide the current value or predicted future value to the client device 1300 in connection with initializing simulations. The client device 1300 displays the initial value indicator 1306 in a corresponding position of the graphical user interface element 1304a. The client device 1300 also displays a user input element 1308 for defining the custom value for the first source attribute in connection with determining modified source attributes (e.g., based on a probability distribution for the first source attribute). For instance, the client device 1300 detects a user input to move the user input element 1308 along the graphical user interface element 1304a to indicate the custom value. The client device 1300 also detects interactions with one or more additional elements within the graphical user interface for defining custom values for one or more additional source attributes.

As illustrated in FIG. 13A, in one or more embodiments, the client device 1300 also displays a custom events element 1310 for defining individual events or recurring events. In particular, the client device 1300 can display one or more interfaces, pop-ups dialogues, or other interface elements that allow a user to input events or other outliers that the emissions simulator system 102 utilizes to determine custom probability distributions. For example, the client device 1300 receives one or more user inputs to define the events or outliers, and the emissions simulator system 102 utilizes data associated with the events or outliers to determine a probability distribution for one or more of the source attributes.

After determining user input data via the client device 1300, the emissions simulator system 102 determines one or more probability distributions for source attributes based on the user input data. To illustrate, the emissions simulator system 102 determines customized probability distributions that include modified mode, median, mean, or outliers based on the user input data. The emissions simulator system 102 selects modified source attributes according to the probability distributions and performs a plurality of simulations based on the modified source attributes.

FIG. 13B illustrates the client device 1300 presenting an additional graphical user interface of the client application 1302. In one or more embodiments, after the emissions simulator system 102 provides results of the simulations for display via the client device 1300. For instance, the emissions simulator system 102 generates initial emissions values 1312 by utilizing a modified gradient descent model to iteratively adjust emissions values of a plurality of physical emissions sources based on target emissions values and constraints. Additionally, the emissions simulator system 102 provides the initial emissions values 1312 to the client device 1300 for display within the graphical user interface.

In addition, FIG. 13B illustrates that the client device 1300 displays a plurality of simulation results 1314a-1314b. For instance, in response to performing a plurality of simulations based on modified source attributes (e.g., according to user input data provided via the client device 1300 or another client device) the emissions simulator system 102 determines simulated emissions values (e.g., modified target emissions values). The client device 1300 displays the simulation results 1314a-1314b in the graphical user interface for comparing with the initial emissions values 1312. Thus, the client device 1300 in FIG. 13B displays first simulation results 1314a corresponding to a first simulation and second simulation results 1314b corresponding to a second simulation. In additional embodiments, the client device 1300 displays more or fewer simulation results, or displays the simulations results separately from the initial emissions values 1312.

In one or more embodiments, the client device 1300 also displays action recommendations 1316a-1316b in connection with a plurality of simulations. Specifically, as illustrated in FIG. 13B, the client device 1300 displays first action recommendations 1316a based on differences between the initial emissions values 1312 and the first simulation results 1314a. Additionally, the client device 1300 displays second action recommendations 1316b based on differences between the initial emissions values 1312 and the second simulation results 1314b. In some embodiments, the client device 1300 displays simulations results and/or action recommendations only if the corresponding simulations result in differences relative to the initial emissions values 1312 (e.g., if the simulation indicates that the modified source attributes cause the entity to be unable to achieve target emissions values). The client device 1300 may also provide the ability for interacting with the action recommendations 1316a-1316b to view additional details or generate annotations for one or more action recommendations.

According to one or more embodiments, the emissions simulator system 102 detects interactions with one or more action recommendations for modifying physical emissions sources according to the corresponding simulation results. For instance, in response to the client device 1300 detecting an interaction with the action recommendations 1316a, the emissions simulator system 102 generates instructions to provide to one or more source modification devices. To illustrate, the emissions simulator system 102 determines one or more emissions value modifications based on the simulation results 1314a. The emissions simulator system 102 generates instructions to modify one or more physical emissions sources according to the action recommendations 1316a and provides the instructions to the source modification devices to apply one or more changes to the physical emissions sources. Specifically, the emissions simulator system 102 updates control settings associated with the physical emissions sources to limit usage/time based on a modified source attribute corresponding to the action recommendations 1316a.

In additional embodiments, the emissions simulator system 102 monitors source attributes associated with one or more sets of action recommendations. The emissions simulator system 102 detects changes to source attributes of the physical emissions sources (e.g., based on data from a third-party system or via data entered via the client device 1300 or another client device) and selects one or more action recommendations based on the corresponding simulation results. The emissions simulator system 102 generates instructions to automatically modify one or more physical emissions sources according to the modified attribute(s) and the corresponding action recommendations. The emissions simulator system 102 modifies the physical emissions source(s) by providing the instructions to the one or more source modification devices. Accordingly, the emissions simulator system 102 can automatically implement action recommendations of a plan to adjust performance/usage of physical emissions sources based on user selections and/or monitored changes in source attributes.

Figure 14:
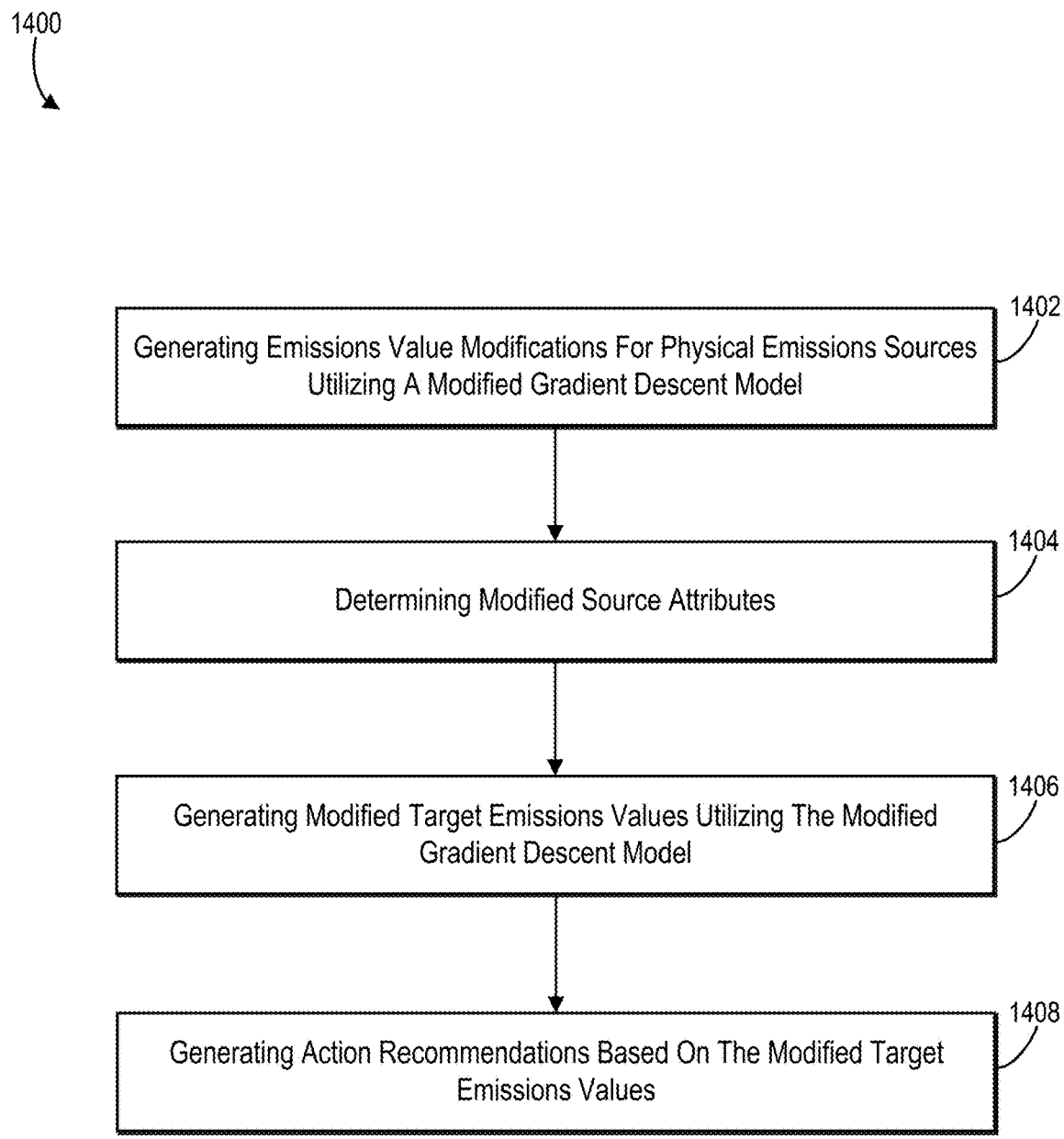
FIG. 14 illustrates a flowchart of a series of acts for generating action recommendations for modifying physical emissions sources based on simulations utilizing a modified gradient descent model in accordance with one or more implementations.

Turning now to FIG. 14, this figure shows a flowchart of a series of acts 1400 of generating action recommendations for modifying physical emissions sources based on simulations utilizing a modified gradient descent model. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

As shown, the series of acts 1400 includes an act 1402 of generating emissions value modifications for physical emissions sources utilizing a modified gradient descent model. For example, act 1402 involves generating, utilizing a modified gradient descent model, a plurality of emissions value modifications for a plurality of physical emissions sources corresponding to an entity according to a plurality of constraints and one or more target emissions values, the plurality of physical emissions sources corresponding to one or more initial source attributes. Act 1402 can involve utilizing the modified gradient descent model to iteratively adjust emissions values corresponding to the plurality of physical emissions sources based on the plurality of constraints and the one or more target emissions values. In one or more embodiments, the emissions optimizer system 112 utilizes the modified gradient descent model 114 to perform act 1402 as described above with respect to FIGS. 1-4. In some embodiments, the emissions optimizer system 112 also utilizes the natural language processing engine 500 to perform act 1402, as described above with respect to FIG. 5.

The series of acts 1400 also includes an act 1404 of determining modified source attributes. For example, act 1404 involves determining a plurality of modified source attributes corresponding to the plurality of physical emissions sources. For example, act 1404 can involve determining the plurality of modified source attributes based on one or more probability distributions representing source attributes of the plurality of physical emissions sources. In one or more embodiments, the emissions simulator system 102 performs act 1404, as described above with respect to FIGS. 9-11A. For example, the emissions simulator system 102 determines the plurality of modified source attributes based on physical emissions source data, performs one or more simulations, and updates the modified source attributes in a feedback loop.

Act 1404 can involve determining one or more probability distributions based on historical data associated with the plurality of physical emissions sources. Act 1404 can also involve sampling the plurality of modified source attributes from the one or more probability distributions.

Act 1404 can involve selecting a probability distribution for a source attribute of one or more physical emissions sources of the plurality of physical emissions sources. Act 1404 can involve sampling a set of modified source attributes from the probability distribution of the source attribute utilizing a Monte Carlo sampling model. For instance, act 1404 can involve randomly sampling data points from the probability distribution of the source attribute.

Alternatively, act 1404 can involve determining, utilizing a heuristic sampling model, a probability distribution for a source attribute of one or more physical emissions sources of the plurality of physical emissions sources based on historical data associated with the plurality of physical emissions sources and one or more user inputs indicating one or more weights associated with the plurality of physical emissions sources. Act 1404 can involve sampling a set of modified source attributes from the probability distribution of the source attribute.

Act 1404 can involve determining a first modified source attribute from a first probability distribution corresponding to a first source attribute based on the historical data associated with the plurality of physical emissions sources. Act 1404 can involve determining a second modified source attribute from a second probability distribution corresponding to a second source attribute based on the historical data associated with the plurality of physical emissions sources.

Act 1404 can involve determining the plurality of modified source attributes comprises randomly sampling a modified source attribute from a probability distribution of the one or more probability distributions. For example, act 1404 can involve determining the plurality of modified source attributes comprises randomly sampling an additional modified source attribute from the probability distribution of the one or more probability distributions.

Act 1404 can involve determining the one or more probability distributions based on the historical data and one or more user inputs indicating one or more weights associated with the plurality of physical emissions sources. For example, act 1404 can involve determining that the one or more user inputs indicate an outlier event associated with the plurality of physical emissions sources. Act 1404 can involve sampling the plurality of modified source attributes from the one or more probability distributions.

Act 1404 can involve determining a first set of modified source attributes from a plurality of probability distributions representing the source attributes. Act 1404 can also involve determining a second set of modified source attributes from the plurality of probability distributions representing the source attributes.

Act 1404 can involve determining contribution proportions of the plurality of physical emissions sources to one or more combined source attribute values of the plurality of physical emissions sources. For example, act 1404 can involve determining an order of contribution proportions of the plurality of physical emissions sources to emissions values corresponding to the plurality of physical emissions sources. Act 1404 can involve generating, utilizing the modified gradient descent model, the one or more modified target emissions values based on the contribution proportions of the plurality of physical emissions sources. For example, act 1404 can involve determining the plurality of modified source attributes based on the order of contribution proportions of the plurality of physical emissions sources.

Additionally, the series of acts 1400 includes an act 1406 of generating modified target emissions values utilizing the modified gradient descent model. For example, act 1406 involves generating, utilizing the modified gradient descent model, one or more modified target emissions values for the plurality of physical emissions sources based on the plurality of modified source attributes. Act 1406 can involve generating, utilizing the modified gradient descent model, the one or more modified target emissions values by substituting the one or more initial source attributes with the plurality of modified source attributes. In one or more embodiments, the emissions simulator system 102 utilizes a modified gradient descent model to perform act 1406, as described above with respect to FIGS. 10 and 11B.

Act 1406 can involve generating, utilizing the modified gradient descent model, the one or more modified target emissions values based on a first modified source attribute and a second modified source attribute. Alternatively, act 1406 can involve generating, utilizing the modified gradient descent model, a first set of modified target emissions values based on the first modified source attribute and a second set of modified target emissions values based on the second modified source attribute.

Act 1406 can also involve generating the one or more modified target emissions values comprises generating, utilizing the modified gradient descent model, a set of modified target emissions values based on the modified source attribute. Act 1406 can involve generating, utilizing the modified gradient descent model, an additional set of modified target emissions values based on the additional modified source attribute.

Act 1406 can involve generating a first set of modified target emissions values based on a first set of modified source attributes. Act 1406 can involve generating a second set of modified target emissions values based on a second set of modified source attributes.

The series of acts 1400 also includes an act 1408 of generating action recommendations based on the modified target emissions values. For example, act 1408 involves generating one or more action recommendations for modifying the plurality of physical emissions sources for the entity or the plurality of constraints based on differences between the one or more target emissions values and the one or more modified target emissions values. In one or more embodiments, the emissions simulator system 102 performs act 1408, as described above with respect to FIGS. 9, 10, and 11B.

Act 1408 can involve comparing a first set of modified target emissions values to the one or more target emissions values to determine a first set of differences between the first set of modified target emissions values and the one or more target emissions values. Act 1408 can also involve comparing a second set of modified target emissions values to the one or more target emissions values to determine a second set of differences between the second set of modified target emissions values and the one or more target emissions values. Act 1408 can involve generating the plurality of action recommendations to modify the plurality of physical emissions sources based on the first set of differences and the second set of differences.

The series of acts 1400 can also include generating instructions for modifying the one or more physical emissions sources based on an action recommendation corresponding to one or more modified source attributes of the plurality of modified source attributes. For example, the series of acts 1400 can include detecting that an initial source attribute of the plurality of initial source attributes changes to a modified source attribute of the plurality of modified source attributes. Additionally, the series of acts 1400 can include receiving an indication of a selected action recommendation of the one or more action recommendations.

The series of acts 1400 can also include modify, utilizing one or more source modification devices configured to control operations of a plurality of physical emissions sources, one or more physical emissions sources of the plurality of physical emissions sources based on an action recommendation of the one or more action recommendations. For example, the series of acts 1400 can include modifying, utilizing the one or more source modification devices, one or more physical emissions sources corresponding to the modified source attribute based on an action recommendation corresponding to the modified source attribute. Additionally, the series of acts 1400 can include modifying, in response to the selected action recommendation, one or more physical emissions sources by providing instructions to the one or more source modification devices. For example, the series of acts 1400 includes modifying, utilizing one or more service modification devices, one or more control settings associated with the one or more physical emissions sources that limits usage of the one or more physical emissions sources according to the instructions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
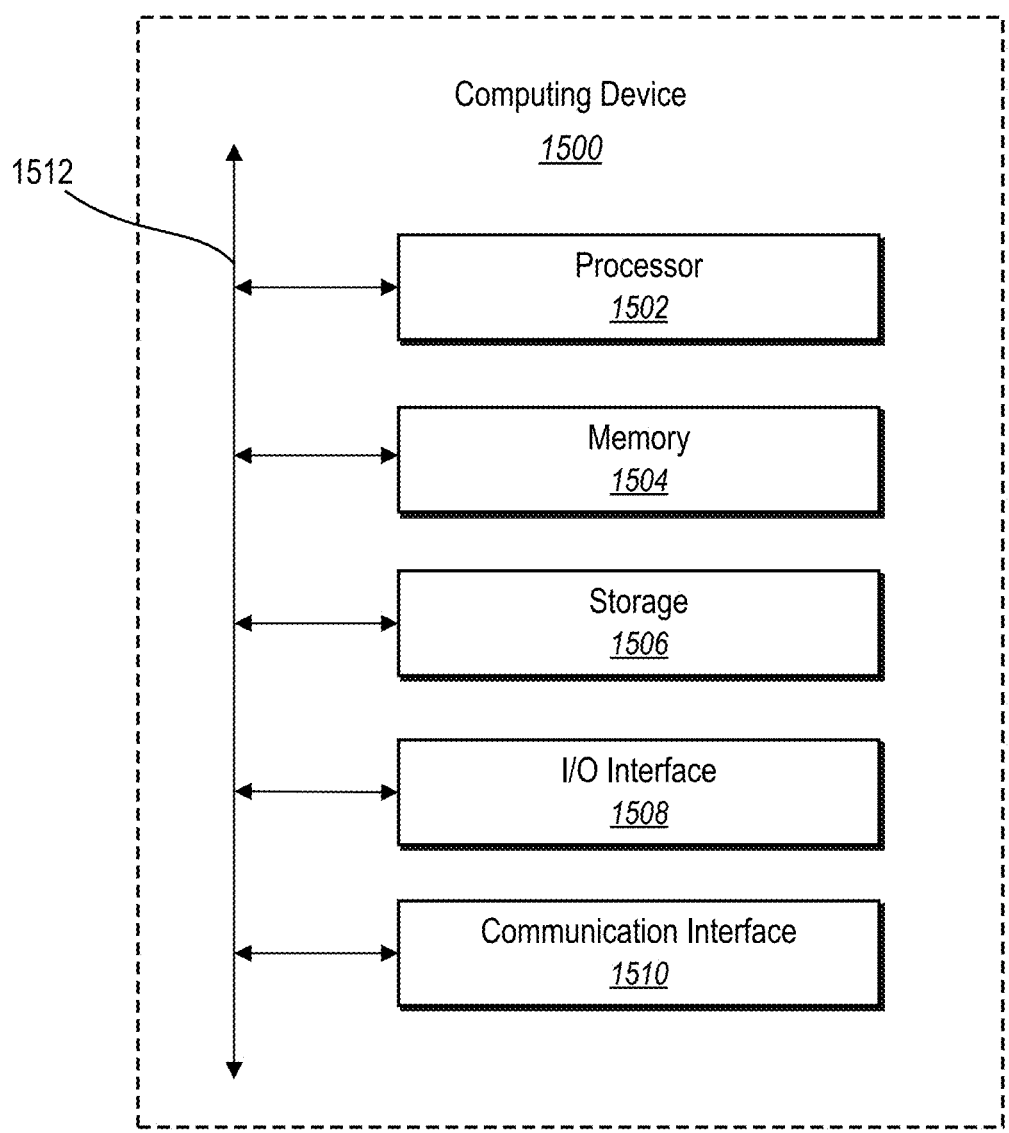
FIG. 15 illustrates a block diagram of an exemplary computing device in accordance with one or more embodiments.

FIG. 15 illustrates a block diagram of exemplary computing device 1500 that may be configured to perform one or more of the processes described above. One will appreciate that one or more computing devices such as the computing device 1500 may implement the system(s) of FIG. 1. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for dynamically modifying workflows, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions for performing the methods described herein.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example, and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining a plurality of physical emissions sources corresponding to an entity and a plurality of emissions values for the plurality of physical emissions sources;
   generating, by at least one processor, a plurality of graphical user interface elements corresponding to the plurality of physical emissions sources corresponding to the entity, the plurality of graphical user interface elements comprising interactive indications of unit constraints and one or more target emissions values for the plurality of physical emissions sources, the unit constraints including one or more minimum constraints or one or more maximum constraints on numbers of physical emissions source units;
   providing, for display within one or more graphical user interfaces of a client device, the plurality of graphical user interface elements comprising the interactive indications of the unit constraints and the one or more target emissions values;
   generating, by the at least one processor utilizing a modified gradient descent model of a mixed-integer programming model and in response to interactions with the interactive indications of the unit constraints and the one or more target emissions values via the one or more graphical user interfaces, a plurality of emissions value modifications for the plurality of physical emissions sources corresponding to the entity according to a plurality of constraints and the one or more target emissions values, the plurality of physical emissions sources corresponding to one or more initial source attributes of the plurality of physical emissions sources and the plurality of constraints comprising a minimum constraint or a maximum constraint on a number of physical emissions source units that produce physical emissions of a particular physical emissions source of the plurality of physical emissions sources and one or more constraints on fuel sources or power sources used by the particular physical emissions source;
   determining, by the at least one processor, a plurality of combinations of a plurality of modified source attributes corresponding to the plurality of physical emissions sources, the plurality of modified source attributes comprising one or more different values than the one or more initial source attributes;
   generating, by the at least one processor utilizing the modified gradient descent model in a plurality of simulations utilizing the plurality of combinations of the plurality of modified source attributes, one or more modified target emissions values for the plurality of physical emissions sources in response to determining that the one or more target emissions values are not achievable with the plurality of combinations of the plurality of modified source attributes in connection with the plurality of constraints including the minimum constraint or the maximum constraint on the number of physical emissions source units that produce physical emissions of the particular physical emissions source;
   generating, by the at least one processor and based on differences between the one or more target emissions values and the one or more modified target emissions values, one or more action recommendations for:
  modifying usage of one or more physical emissions source units of the particular physical emissions source of the plurality of physical emissions sources for the entity to meet the one or more target emissions values according to the plurality of constraints including the minimum constraint and the maximum constraint on the number of physical emissions source units that produce physical emissions of the particular physical emissions source; or
  modifying the minimum constraint or the maximum constraint on the number of physical emissions source units that produce physical emissions of the particular physical emissions source;
generating, for providing to a source modification device that controls the particular physical emissions source, processing instructions for modifying usage of the one or more physical emissions source units of the particular physical emissions source based on a selected action recommendation of the one or more action recommendations; and
modifying, utilizing the source modification device to execute the processing instructions, one or more control settings that apply changes to the one or more physical emissions source units of the particular physical emissions source according to the processing instructions to limit usage of the one or more physical emissions source units of the particular physical emissions source.

2. The computer-implemented method as recited in claim 1, wherein determining the plurality of modified source attributes comprises:
  determining one or more probability distributions based on historical data associated with the plurality of physical emissions sources;
  determining, in response to one or more inputs via a custom events element, one or more individual events or one or more recurring events for the plurality of physical emissions sources;
  generating one or more custom probability distributions by modifying the one or more probability distributions to include one or more outliers representing the one or more individual events or the one or more recurring events; and
  sampling the plurality of modified source attributes from the one or more custom probability distributions.

3. The computer-implemented method as recited in claim 2, wherein determining the plurality of modified source attributes comprises:
  determining a first modified source attribute from a first probability distribution corresponding to a first source attribute based on the historical data associated with the plurality of physical emissions sources;
  determining a second modified source attribute from a second probability distribution corresponding to a second source attribute based on the historical data associated with the plurality of physical emissions sources; and
  generating, utilizing the modified gradient descent model, the one or more modified target emissions values based on the first modified source attribute and the second modified source attribute.

4. The computer-implemented method as recited in claim 2, wherein:
  determining the plurality of modified source attributes comprises randomly sampling a modified source attribute from a probability distribution of the one or more probability distributions, the modified source attribute comprising a modified value of an emissions cost, a source category, or an emissions type different than a corresponding initial source attribute of the one or more initial source attributes; and
  generating the one or more modified target emissions values comprises generating, utilizing the modified gradient descent model, a set of modified target emissions values based on the modified source attribute.

5. The computer-implemented method as recited in claim 4, wherein:
  determining the plurality of modified source attributes comprises randomly sampling an additional modified source attribute from the probability distribution of the one or more probability distributions; and
  generating the one or more modified target emissions values comprises generating, utilizing the modified gradient descent model, an additional set of modified target emissions values based on the additional modified source attribute.

6. The computer-implemented method as recited in claim 2, wherein determining the plurality of modified source attributes comprises:
  determining the one or more probability distributions based on the historical data and one or more user inputs indicating one or more weights associated with the plurality of physical emissions sources; and
  sampling the plurality of modified source attributes from the one or more probability distributions.

7. The computer-implemented method as recited in claim 6, wherein determining the plurality of modified source attributes further comprises determining that the one or more user inputs indicate an outlier event modifying the one or more probability distributions associated with the plurality of physical emissions sources and corresponding modified source attributes.

8. The computer-implemented method as recited in claim 2, wherein determining the plurality of modified source attributes comprises:
  determining an order of contribution proportions of the plurality of physical emissions sources to emissions values corresponding to the plurality of physical emissions sources; and
  determining the plurality of modified source attributes based on the order of contribution proportions of the plurality of physical emissions sources.

9. The computer-implemented method as recited in claim 1, further comprising:
  providing the one or more action recommendations for display within the one or more graphical user interfaces of the client device with a modification element indicating a value modification for the particular physical emissions source with the plurality of graphical user interface elements;
  generating, for providing to one or more source modification devices that control one or more physical emissions sources, instructions for modifying the one or more physical emissions sources based on a selection, via the one or more graphical user interfaces, of an action recommendation corresponding to one or more modified source attributes of the plurality of modified source attributes according to the value modification indicated by the modification element; and
  modifying, utilizing the one or more source modification devices, a control setting that applies changes to the one or more physical emissions sources according to the instructions to limit usage of the one or more physical emissions sources.

10. A system comprising:
one or more source modification devices configured to control operations of a plurality of physical emissions sources; and
one or more processors configured to cause the system to:
determine the plurality of physical emissions sources corresponding to an entity and a plurality of emissions values for the plurality of physical emissions sources;
generate a plurality of graphical user interface elements corresponding to the plurality of physical emissions sources corresponding to the entity, the plurality of graphical user interface elements comprising interactive indications of unit constraints and one or more target emissions values for the plurality of physical emissions sources, the unit constraints including one or more minimum constraints or one or more maximum constraints on numbers of physical emissions source units;
provide, for display within one or more graphical user interfaces of a client device, the plurality of graphical user interface elements comprising the interactive indications of the unit constraints and the one or more target emissions values;
generate, utilizing a modified gradient descent model of a mixed-integer programming model and in response to interactions with the interactive indications of the unit constraints and the one or more target emissions values via the one or more graphical user interfaces, a plurality of emissions value modifications for the plurality of physical emissions sources corresponding to one or more initial source attributes based on the one or more target emissions values and a plurality of constraints comprising a minimum constraint or a maximum constraint on a number of physical emissions source units that produce physical emissions of a particular physical emissions source of the plurality of physical emissions sources and one or more constraints on fuel sources or power sources used by the particular physical emissions source;
determine a plurality of combinations of a plurality of modified source attributes corresponding to the plurality of physical emissions sources based on one or more probability distributions representing source attributes of the plurality of physical emissions sources, the plurality of modified source attributes comprising one or more different values than the one or more initial source attributes;
generate, utilizing the modified gradient descent model in a plurality of simulations utilizing the plurality of combinations of the plurality of modified source attributes, one or more modified target emissions values for the plurality of physical emissions sources in response to determining that the one or more target emissions values are not achievable with the plurality of combinations of the plurality of modified source attributes in connection with the plurality of constraints including the minimum constraint or the maximum constraint on the number of physical emissions source units that produce physical emissions of the particular physical emissions source;
generate, based on differences between the one or more target emissions values and the one or more modified target emissions values, one or more action recommendations for:
    modifying usage of one or more physical emissions source units of the particular physical emissions source of the plurality of physical emissions sources to meet the one or more target emissions values according to the plurality of constraints including the minimum constraint and the maximum constraint on the number of physical emissions source units that produce physical emissions of the particular physical emissions source; or
    modifying the minimum constraint or the maximum constraint on the number of physical emissions source units that produce physical emissions of the particular physical emissions source;
generate, for providing to a source modification device that controls the particular physical emissions source, processing instructions for modifying usage of the one or more physical emissions source units of the particular physical emissions source based on a selected action recommendation of the one or more action recommendations; and
modify, utilizing the source modification device that controls the particular physical emissions source to execute the processing instructions, one or more control settings that apply changes to the one or more physical emissions source units of the particular physical emissions source according to the processing instructions to limit usage of the one or more physical emissions source units of the particular physical emissions source.

11. The system as recited in claim 10, wherein the one or more processors are further configured to cause the system to modify the one or more control settings by:
detecting that an initial source attribute of the one or more initial source attributes changes to a modified source attribute of the plurality of modified source attributes; and
modifying, utilizing the one or more source modification devices, the one or more control settings based on the plurality of simulations utilizing the plurality of combinations of modified source attributes and an action recommendation corresponding to the modified source attribute.

12. The system as recited in claim 10, wherein the one or more processors are further configured to cause the system to modify the one or more control settings to limit an operating temperature, an operating speed, an operating power, or an operating time of the one or more physical emissions source units of the particular physical emissions source.

13. The system as recited in claim 10, wherein the one or more processors are further configured to cause the system to determine the one or more probability distributions representing the source attributes of the plurality of physical emissions sources by:
selecting a probability distribution for a source attribute of one or more physical emissions sources of the plurality of physical emissions sources; and
sampling a set of modified source attributes from the probability distribution of the source attribute utilizing a Monte Carlo sampling model.

14. The system as recited in claim 10, wherein the one or more processors are further configured to cause the system to determine the one or more probability distributions representing the source attributes of the plurality of physical emissions sources by:
determining a probability distribution for a source attribute of one or more physical emissions sources of the plurality of physical emissions sources based on historical data associated with the plurality of physical emissions sources and one or more user inputs indicating one or more weights associated with the plurality of physical emissions sources; and sampling a set of modified source attributes from the probability distribution of the source attribute.

15. The system as recited in claim 10, wherein the one or more processors are further configured to cause the system to:

determine a first set of modified source attributes from a plurality of probability distributions representing the source attributes;

generate a first set of modified target emissions values based on the first set of modified source attributes;

determine a second set of modified source attributes from the plurality of probability distributions representing the source attributes; and generate a second set of modified target emissions values based on the second set of modified source attributes.

16. The system as recited in claim 10, wherein the one or more processors are further configured to cause the system to:

determine that the one or more target emissions values are not feasible according to the minimum constraint or the maximum constraint:

update the minimum constraint or the maximum constraint in response to a selection of an action recommendation to modify the minimum constraint or the maximum constraint; and generate the processing instructions for modifying the usage of the one or more physical emissions source units based on the selected action recommendation in response to updating the minimum constraint or the maximum constraint.

17. A non-transitory computer readable storage medium comprising instructions that, when executed by at least one processor, cause a computing device to perform operations comprising:

determining a plurality of physical emissions sources corresponding to an entity and a plurality of emissions values for the plurality of physical emissions sources;

generating a plurality of graphical user interface elements corresponding to the plurality of physical emissions sources corresponding to the entity, the plurality of graphical user interface elements comprising interactive indications of unit constraints and one or more target emissions values for the plurality of physical emissions sources, the unit constraints including one or more minimum constraints or one or more maximum constraints on numbers of physical emissions source units;

providing, for display within one or more graphical user interfaces of a client device, the plurality of graphical user interface elements comprising the interactive indications of the unit constraints and the one or more target emissions values;

generating, utilizing a modified gradient descent model of a mixed-integer programming model and in response to interactions with the interactive indications of the unit constraints and the one or more target emissions values via the one or more graphical user interfaces, a plurality of emissions value modifications for the plurality of physical emissions sources corresponding to one or more initial source attributes based on the one or more target emissions values and a plurality of constraints comprising a minimum constraint or a maximum constraint on a number of physical emissions source units that produce physical emissions of a particular physical emissions source of the plurality of physical emissions sources and one or more constraints on fuel sources or power sources used by the particular physical emissions source;

determining a plurality of combinations of modified source attributes corresponding to the plurality of physical emissions sources based on a plurality of probability distributions representing source attributes of the plurality of physical emissions sources, the plurality of combinations of modified source attributes comprising one or more different values than the one or more initial source attributes;

generating, utilizing the modified gradient descent model in a plurality of simulations utilizing the plurality of combinations of modified source attributes, sets of modified target emissions values for the plurality of physical emissions sources in response to determining that the one or more target emissions values are not achievable with the plurality of combinations of modified source attributes in connection with the plurality of constraints including the minimum constraint or the maximum constraint on the number of physical emissions source units that produce physical emissions of the particular physical emissions source;

generating, based on differences between the one or more target emissions values and the sets of modified target emissions values, a plurality of action recommendations for:

modifying usage of one or more physical emissions source units of the particular physical emissions source of the plurality of physical emissions sources; or modifying the minimum constraint or the maximum constraint on the number of physical emissions source units that produce physical emissions of the particular physical emissions source;

generate, for providing to a source modification device that controls the particular physical emissions source, processing instructions for modifying usage of the one or more physical emissions source units of the particular physical emissions source based on a selected action recommendation of the plurality of action recommendations; and modify, utilizing the source modification device to execute the processing instructions, one or more control settings that apply changes to the one or more physical emissions source units of the particular physical emissions source according to the processing instructions to limit usage of the one or more physical emissions source units of the particular physical emissions source.

18. The non-transitory computer readable storage medium as recited in claim 17, wherein generating the plurality of action recommendations comprises:

comparing a first set of modified target emissions values generated based on the plurality of simulations to the one or more target emissions values to determine a first set of differences between the first set of modified target emissions values and the one or more target emissions values;

comparing a second set of modified target emissions values generated based on the plurality of simulations to the one or more target emissions values to determine a second set of differences between the second set of modified target emissions values and the one or more target emissions values; and generating the plurality of action recommendations to modify usage of the one or more physical emissions source units of the particular physical emissions source of the plurality of physical emissions sources based on the first set of differences and the second set of differences.

19. The non-transitory computer readable storage medium as recited in claim 17, wherein determining the plurality of combinations of modified source attributes comprises:
   determining the plurality of probability distributions based on historical data associated with the plurality of physical emissions sources;
   determining a first set of modified source attributes by randomly sampling data points from the plurality of probability distributions representing the source attributes; and
   determining a second set of modified source attributes by randomly sampling data points from the plurality of probability distributions representing the source attributes.

20. The non-transitory computer readable storage medium as recited in claim 19, wherein generating the sets of modified target emissions values comprises:
   generating, utilizing the modified gradient descent model in a first simulation, a first set of modified target emissions values based on the first set of modified source attributes; and
   generating, utilizing the modified gradient descent model in a second simulation, a second set of modified target emissions values based on the second set of modified source attributes.

* * * * *